United States Patent [19]

Seibert et al.

[11] 4,247,311
[45] Jan. 27, 1981

[54] DOWNFLOW OR UPFLOW ADSORBENT FRACTIONATOR FLOW CONTROL SYSTEM

[75] Inventors: Chesterfield F. Seibert; Harry Cordes, both of Cortland, N.Y.

[73] Assignee: Pall Corporation, Glen Cove, N.Y.

[21] Appl. No.: 954,812

[22] Filed: Oct. 26, 1978

[51] Int. Cl.³ .................. B01D 53/04; B01D 53/26
[52] U.S. Cl. ......................... 55/162; 55/163; 55/179; 55/275; 55/387; 55/389
[58] Field of Search ............ 55/33, 62, 162, 163, 55/179, 189, 208, 275, 387, 389

[56] References Cited

U.S. PATENT DOCUMENTS

| | | | |
|---|---|---|---|
| 2,306,610 | 12/1942 | Barrer | 55/75 X |
| 2,442,191 | 5/1948 | Black | 55/75 X |
| 2,800,197 | 7/1957 | Wynkoop | 55/62 X |
| 2,944,627 | 7/1960 | Skarstrom | 55/33 |
| 3,080,693 | 3/1963 | Glass et al. | 55/33 X |
| 3,287,883 | 11/1966 | Mott | 55/33 |
| 3,324,631 | 6/1967 | Kreuter | 55/163 |
| 3,365,861 | 1/1968 | Crowley et al. | 55/162 |
| 3,448,561 | 6/1969 | Seibert et al. | 55/33 X |
| 3,472,000 | 10/1969 | Glass et al. | 55/163 |
| 3,552,096 | 1/1971 | Dayson | 55/163 |
| 3,561,464 | 2/1971 | Sher et al. | 55/33 X |
| 3,659,399 | 5/1972 | Kauer, Jr. et al. | 55/33 |
| 3,880,616 | 4/1975 | Myers et al. | 55/62 |
| 3,923,479 | 12/1975 | Glass et al. | 55/163 |
| 4,101,298 | 7/1978 | Myers et al. | 55/163 |

FOREIGN PATENT DOCUMENTS 633137 12/1949 United Kingdom ............ 55/58
677150 8/1952 United Kingdom ............ 55/58

*Primary Examiner*—Robert H. Spitzer

[57] ABSTRACT

Apparatus particularly applicable to the drying of gases is provided for downflow or upflow adsorption of one or more first gases from a mixture thereof with a second gas to reduce the concentration of first gas in the mixture to below a permissible maximum concentration, having at least two sorbent beds, of which one is on adsorption while the other is being regenerated, and pneumatically operated valves for flow control of gas through the beds for adsorption and for regeneration. An overriding control such as a timer or a microprocessor programmed to control the regeneration time and purge flow fixes the cycling time, and switches the adsorbent beds at the end of each cycle period.

23 Claims, 13 Drawing Figures

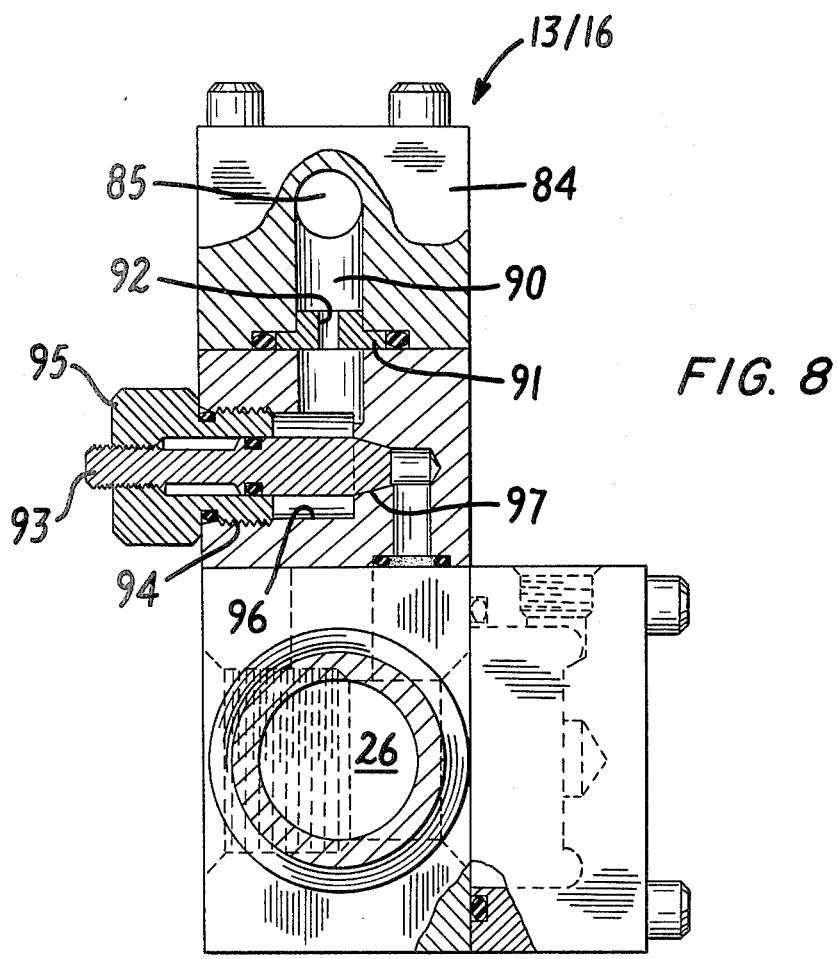
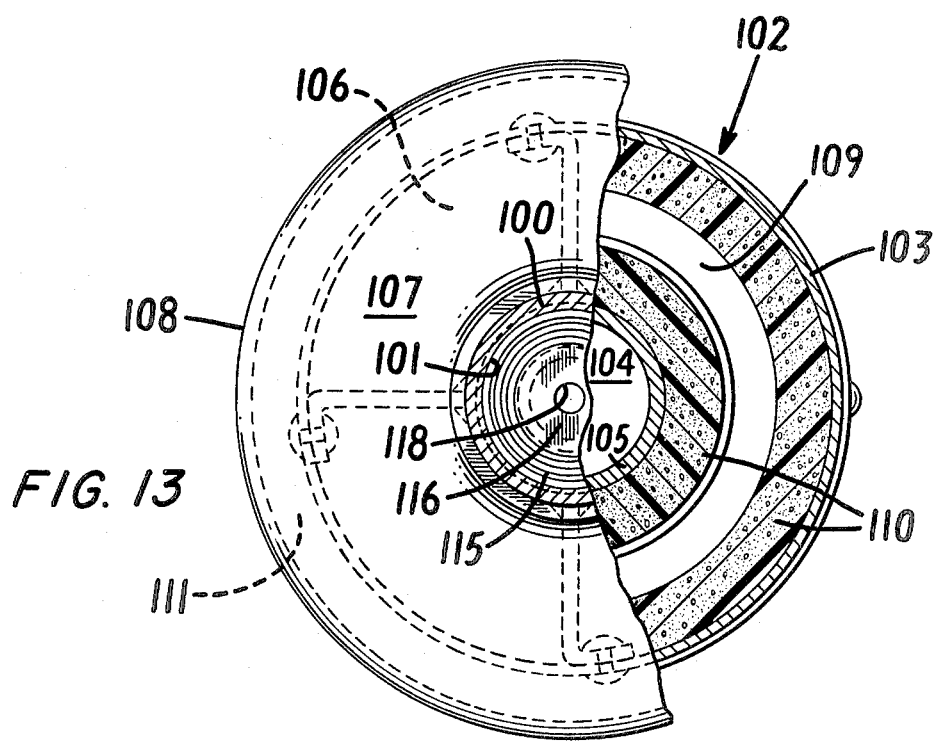

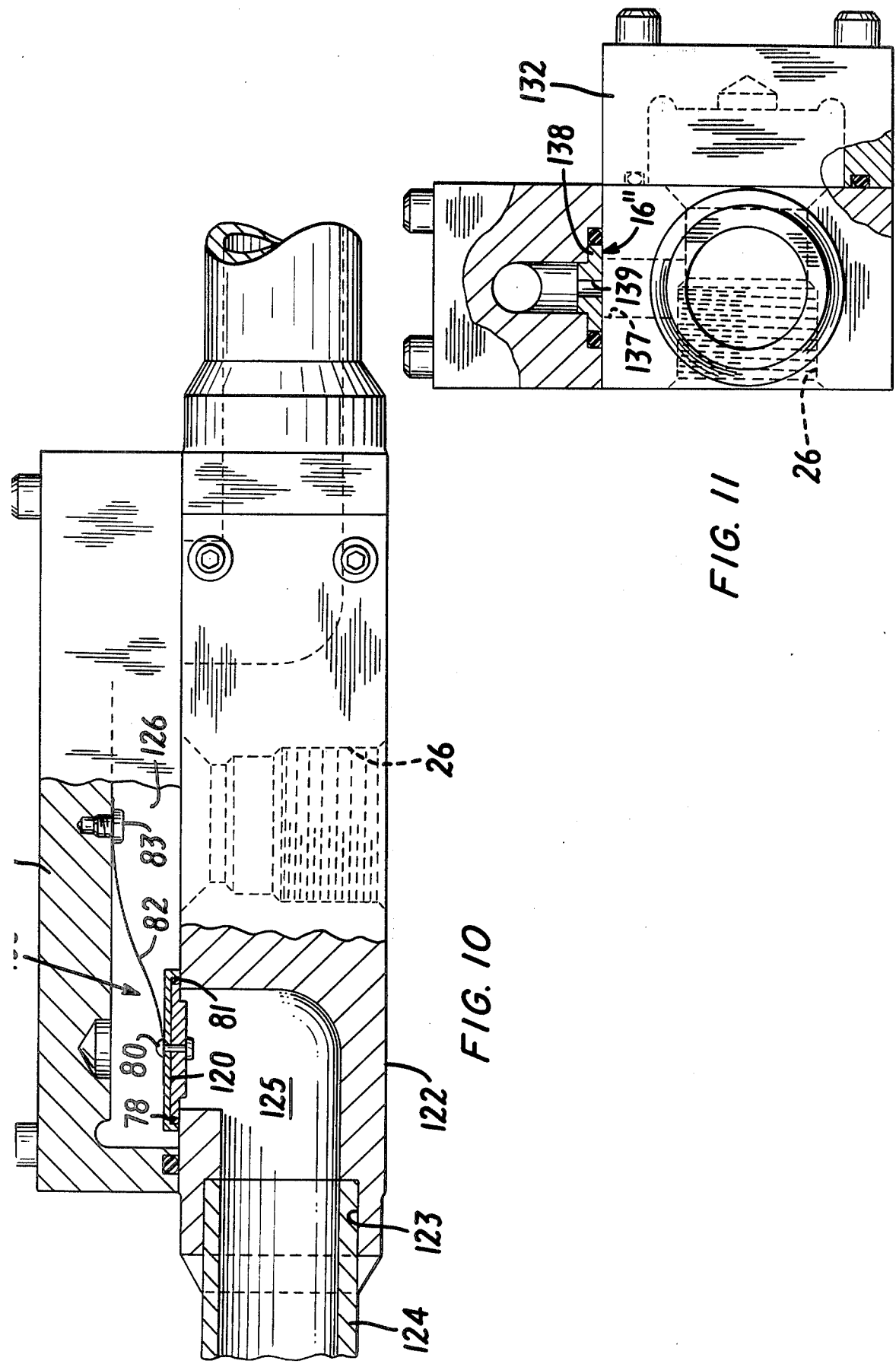

DOWNFLOW OR UPFLOW ADSORBENT FRACTIONATOR FLOW CONTROL SYSTEM

Desiccant dryers have been marketed for many years and are in wide use throughout the world. The usual type is made up of two desiccant beds, one of which is being regenerated while the other is on the drying cycle. The gas to be dried is passed through the one desiccant bed in one direction in the drying cycle, and then, at a predetermined time interval, when the desiccant can be expected to have adsorbed so much moisture that there is a danger that the required low moisture level of the effluent gas will not be met, the influent gas is switched to the other bed, and the spent bed is regenerated by heating and/or by evacuation and/or by passing purge effluent gas therethrough, usually in counterflow.

Desiccant dryers on the market today are of two general types, a heat-reactivatable type, in which heat is applied to regenerate the spent desiccant at the conclusion of the drying cycle, and a heatless dryer, in which heat is not applied to regenerate the spent desiccant at the conclusion of the drying cycle, but which relies upon the use of a purge flow of dry gas, usually effluent gas from the bed on the drying cycle, which is passed through the spent bed at a lower pressure, with rapid cycling to conserve the heat of adsorption to aid in the regeneration of the spent bed. The use of a purge gas to regenerate at a lower pressure than the line pressure of the gas being dried is not, however, confined to heatless dryers, but was used in heat-reactivated desiccant dryers for many years before the advent of the heatless type.

Both types of dryers require periodic cycling of the beds from adsorption to regeneration and back to adsorption. The cycling times can be fixed or variable, according to the system used. Some dryers operate with fixed time drying and regenerating cycles, usually equal in duration, with the length of the cycles being fixed according to the volume of desiccant available and the moisture content of the influent air. The time of the cycle is invariably fixed at much less time than might be permitted, in order to ensure that the moisture content of the effluent gas will always meet the system requirements. As the drying cycle proceeds, the desiccant bed becomes progressively more and more saturated from the inlet end towards the outlet end, and less and less capable of adsorbing moisture that is carried through it by the influent gas. Removal of moisture from the influent gas depends upon the rate of flow of the gas and the rate of moisture adsorption and moisture content of the adsorbent, as well as the temperature and pressure of gas within the bed. The rate of adsorption by the desiccant may decrease as the desiccant becomes loaded. Since the moisture content of an influent gas is rarely constant, the demand put upon the desiccant bed can vary, sometimes rather rapidly, and sometimes within rather wide limits. Consequently, a fixed time drying cycle must always be short enough to give a safe margin for moisture removal at maximum moisture content of the influent gas, and this means that frequently a fixed time cycle must be rather short, to be sure it is ended before the available remaining moisture capacity of the bed reaches too low a level. This means, of course, that in the average cycle, the moisture capacity of the bed may not be well utilized.

The life of a desiccant that is heated in order to regenerate it is to a considerable extent dependent upon the frequency of regeneration. It is a rule of thumb in the trade that a desiccant bed is good for a certain number of regenerations, and no more. Obviously, then, the effective life of a bed is shortened unnecessarily, whenever during each drying cycle the moisture capacity is not effectively utilized. Furthermore, the inability to achieve a full utilization of the effective bed capacity during each drying cycle, both in the case of heat-reactivated and heatless dryers, means that the volume of the desiccant bed must be more than what might be required, to provide the reserve capacity needed to adsorb extreme but occasional moisture levels of the influent gas during the fixed time period of the drying cycle.

Inefficient utilization of moisture capacity also leads to a considerable waste of purge gas with each cycle. Purge gas is normally bled off from the effluent gas, for the purpose of regeneration of a spent bed, and correspondingly reduces the yield of effluent. Each time a bed is transferred from the drying cycle to the regenerating cycle, a volume of purge gas equal to the open volume of the bed vessel is necessarily dumped, and lost. Short cycling means higher dump losses than long cycling.

Such losses are particularly severe in the case of heatless dryers, which require much more frequent cycling. Indeed, the choice between a heat-regenerated and a heatless dryer frequently is dictated by the frequency of recycling required. Skarstrom in U.S. Pat. No. 2,944,627, dated July 12, 1960, describes a type of heatless dryer which purports to represent an improvement on those described some years earlier by Wynkoop, U.S. Pat. No. 2,800,197, dated July 23, 1957, and in British Pat. Nos. 633,137 and 677,150. Skarstrom showed that by very rapid cycling between adsorption and desorption in the respective zones, the desorption cycle could effectively utilize the heat of adsorption for regeneration of spent desiccant. Skarstrom accordingly taught the use of times in the adsorption cycle not exceeding two to three minutes, preferably less than one minute, and very desirably less than twenty seconds. Such cycling times are of course shorter than Wynkoop's, which was of the order of thirty minutes or higher, as shown in the graph of FIG. 2, or the cycling times ranging from five minutes to thirty minutes, of British Pat. No. 633,137. British Pat. No. 677,150 demonstrated that the adsorption and desorption cycles need not necessarily be equal.

The drawback of the Skarstrom system, however, is the very considerable volume of purge gas lost with each cycle, and this loss is very much greater at a cycling time of, for instance, ten seconds, as compared to the British patents' five to thirty minutes, and Wynkoop's thirty minutes or longer. In the short Skarstrom cycles, of course, the capacity of the desiccant bed is very little utilized, but when no heat is applied to effect regeneration of the desiccant, it becomes more important not to carry the moisture content of the adsorbent beyond a certain minimum on the adsorption cycle, or it will be impossible effectively to regenerate the adsorbent on the regeneration cycle.

Dryers have been provided with moisture detectors in the effluent line, to measure dewpoints in the effluent gas. Because of their slow response and relative insensitivity to low dewpoints, however, such devices have not been and cannot be used to determine the cycling of a dryer when an effluent of low dewpoint or relative humidity is desired, since by the time the detector has sensed moisture in the effluent, the front has broken through the bed.

Seibert and Verrando, U.S. Pat. No. 3,448,561, patented June 10, 1969, provide process and apparatus for fractionating and especially drying gases with and without application of heat during regeneration which better utilize the moisture capacity of a desiccant bed by providing for regeneration thereof only when the moisture load on the bed requires it, and thus obtain optimum efficiency in use. During each adsorption cycle, the sorbent bed can be brought to the limiting moisture capacity at which regeneration can be effected under the available regenerating conditions, whether these be with or without the application of heat, and with or without the application of a reduced pressure. This is made possible by detecting the advance of the moisture front within the bed, as evidenced by the moisture content of the gas being dried, and halting the drying cycle whenever the front has reached a predetermined point in the bed, short of breaking out of the bed. This can be done automatically by providing in the desiccant bed means for sensing the moisture content of the gas being dried, and means responsive to moisture content to halt the drying cycle whenever a predetermined moisture content in the gas being dried is reached at that point.

It has recently been proposed to avoid the difficulties attendant on use of heatless dryers by combination with the dryer of a microprocessor programmed to sense the operating conditions, including flow rate, inlet and outlet temperature and pressure and regenerating pressure; from the operating conditions so sensed calculate the quantity of purge required to regenerate the adsorbent bed has been regenerated, control the cycling time, and switch the sorbent beds at the end of each cycle period.

The principle is to adjust the off-stream adsorbent bed purge flow and regeneration time to fit the degree of depletion of the adsorbent bed during the on-stream portion of the cycle. The on-stream cycle time can then be fixed, without disadvantage; since there is no waste of purge flow during regeneration, it does not matter how frequently the beds are cycled.

The fixing of the cycling time is a minor problem, compared with the task of actually carrying out the interchange of the beds. The gas flows at both the inlet and the outlet of each dryer bed have to be reversed, as well as exchanged, since flow during regeneration is usually in the opposite direction from adsorption, so as to avoid unnecessary loading of downstream sorbent during regeneration by the gas, such as moisture, being desorbed. A formidable array of valves have to be switched, and a failure in a single valve can result in malfunction of the entire dryer system. If electrically operated valves are used, and cycling is frequent, as in a heatless dryer, the energy costs are also high, and malfunction due to an electrical fault or power failure or low voltage is possible.

Each time a cycling occurs, a bed is depressurized by venting to atmosphere, and this can be noisy.

It can also result in churning of the sorbent bed, and disintegration and even pulverization of the sorbent bed particles. Even addition of muffling or sound desorbing devices to the exhaust outlet valve have not successfully reduced the blast to tolerable levels when the system is operated under high sorption pressures.

While twenty years ago sorbent bed fractionators were operated with either upflow or downflow gas flow during adsorption, in recent years adsorption by upflow has become standard practice, because it was considered less likely to give rise to high velocity flow channelling in the bed, interfering with adsorption efficiency because of flow rate variations and a decreased likelihood of the gas encountering the sorbent surface during passage through the bed.

In accordance with the present invention apparatus particularly applicable to the drying of gases is provided for downflow or upflow adsorption of one or more first gases from a mixture thereof with a second gas to reduce the concentration of first gas in the mixture to below a permissible maximum concentration, having at least two beds, of which one is on adsorption while the other is being regenerated, and pneumatically operated valves for flow control of gas through the beds for adsorption and for regeneration. An overriding control such as a timer or a microprocessor programmed to control the regeneration time and purge flow fixes the cycling time, and switches the adsorbent beds at the end of each cycle period.

The apparatus of the invention is applicable to the "heatless" category of gas fractionators, in which the spent bed is regenerated without application of heat to the bed, utilizing only the heat of adsorption in the bed for desorption during regeneration.

The apparatus of the invention is also applicable to systems wherein part or all of the desiccant bed is heated to effect regeneration, to systems wherein regeneration is effected at reduced pressure, and to systems utilizing a purge gas flow, and to systems combining one or more of these features.

Thus, in the apparatus of the invention, the concentration of one or more first gases in a mixture thereof with a second gas is reduced to below a limiting maximum concentration thereof in the second gas, by passing the mixture in contact with and from one end to another end of one of two beds of a sorbent having a preferential affinity for the first gas, adsorbing first gas thereon to form a gaseous effluent having a concentration thereof below the maximum, and forming a concentration gradient of first gas in the bed progressively decreasing from one end to the other end as the adsorption continues and an increasing concentration of first gas in the bed defining a concentration front progressively advancing in the bed from the one end to the other end as sorbent capacity therefor decreases; while passing a purge flow of gaseous effluent through the other of the two beds of sorbent to desorb first gas adsorbed thereon, and reverse the advance of the concentration front of first gas in the bed, regenerating the other bed for another cycle of adsorption; and then periodically interchanging the beds so that, alternately, one bed is on regeneration and the other on the adsorption portions of the cycle.

The cycling interchange of the beds can be controlled by conventional control devices, which form no part of the invention. A fixed time cycle can be imposed by a mechanical, pneumatic, electrical or electronic timer or timing device, such as a clock timer. A variable timer device can be utilized, based on moisture-sensing devices, as in U.S. Pat. No. 3,448,561.

A microprocessor can be used, sensing the operating conditions including gas flow rate through the bed on adsorption; inlet and outlet temperatures; inlet and outlet pressures; and regeneration pressure in the bed on regeneration; calculating the quantity of purge flow required to regenerate the sorbent in the bed on regeneration; calculating the purge flow rate under the operating conditions; and then controlling the regeneration time and arresting purge flow when the bed on regeneration has been regenerated; controlling cycling time at a period not shorter than the regeneration time, and switching the sorbent beds at the end of such cycling time. Since the regeneration cycle need not be and in most cases is not of a duration equal to the drying cycle in such a system, the bed being regenerated is closed off, and heating, purge, evacuation, or whatever regeneration system is used, discontinued when regeneration is complete. The remainder of the cycle time can be used for instance for cooling down of the regenerated bed, so that it is at a convenient and efficient temperature for adsorption when the flow of influent gas to that bed is resumed.

One feature of the apparatus of the invention is a plurality of pneumatically operated flow control valves responsive to differential pressure thereacross and movable between flow-open and flow-closed positions according to the application thereto of a predetermined pilot gas pressure controlled by the cycling control device, overcoming the prevailing system pressure differential at the valve, and any biasing force of a bias means, if present. Thus, when application of pilot gas pressure is interrupted by the control device, the valve will return to its original open or closed position under the prevailing system pressure differential across the valve, and/or any biasing force of a bias means, if present. Since the flow control valves are pneumatic, they are not subject to electrical malfunction.

Retention of the valve in one of the open and closed positions is controlled by system gas pressure applied against one face of a piston and/or by bias means such as a spring, and movement of the valve towards the other of the open and closed positions is controlled by pilot gas pressure applied against the same or an opposite face of the piston. The term "pilot gas" is inclusive of gas from a separate source of supply, and of system gas, and pilot gas pressure is applied by the cycling control device to move the valve. One face of the piston is in communication with upstream and one face with downstream gas pressure in the line controlled by the valve, and one of these faces is also in communication with the pilot gas port. Whenever gas pressure is applied to one face of the piston via the pilot gas port under the control of the control means, the piston is moved to the other of its open or closed positions.

By appropriate flow communication of the pilot gas port in any line of the sorbent bed chamber and gas piping system, the valve can be made to open or close according to pressure differential at various stages of the adsorption and regeneration cycles, and thus put the inlet and outlet into communication at appropriate times, and open or close the line, as desired, according to application of gas pressure to the pilot gas port.

A further feature of the apparatus of the invention is a dump or exhaust control valve that regulates or limits exhaust flow from a sorbent bed prior to regeneration, not only reducing noise but also reducing dump flow rate and sorbent bed churning and abrasion during depressurization.

This valve comprises a coil spring valve having a pressure-receiving face exposed to gas pressure in one of the two sorbent bed chambers via the exhaust valve, and on the opposite side a pressure-receiving face exposed to atmospheric pressure, and a critical orifice for bleeding gas past the valve when the valve is closed, and thereby regulates or limits exhaust flow from the chamber. When the exhaust valve opens to atmospheric pressure the chamber going into regeneration, reducing pressure from operating pressure to atmospheric, the coil spring under the resulting pressure differential thereacross is compressed shut, but flow can proceed via the critical orifice. The differential pressure diminishes until it is below that at which damage to the bed can result. The spring gradually opens, to permit flow through the coils as pressure differential diminishes.

Downstream of the dump control valve there is a muffler, to diffuse flow before it enters the atmosphere. It also contains sound-absorbing material, and thereby attenuates the noise. The sound-absorbing material can be any available such material.

One preferred embodiment of the gas fractionating apparatus in accordance with the invention comprises as the essential components at least two sorbent beds adapted for alternate periodic and preferably downflow adsorption, and periodic preferably counterflow and preferably upflow regeneration; one or a plurality of means in the bed for sensing the gas flow rate through the bed on adsorption, inlet and outlet gas temperatures and pressures, and regeneration pressure; and a microprocessor programmed to calculate the quantity of purge required to regenerate the adsorbent bed off-stream for regeneration; calculate the purge flow rate; and, based on these calculations, control the regeneration time so that purge flow ceases when the adsorbent bed has been regenerated; control means for controlling the cycling time; and switch the adsorbent beds at the end of each cycle period; and at least one flow control valve comprising a valve element mounted for reciprocable bidirectional movement and having on opposite faces pressure-receiving surfaces open to upstream and downstream gas pressure; and movable in one of two directions between open and closed positions against a valve seat according to the pressure differential therebetween; an optional bias means biasing the valve element into one of the open and closed positions at pressures up to a predetermined minimum; and means for applying sufficient gas pressure to one of the pressure-receiving surfaces to overcome any biasing force of a bias means and move the valve element into a closed or open position.

Another preferred embodiment of the invention comprises as the essential components at least two sorbent beds adapted for alternate periodic and preferably downflow adsorption, and periodic preferably counterflow and preferably upflow regeneration, one or a plurality of means in the beds for sensing the gas flow rate through the bed on adsorption, inlet and outlet gas temperatures and pressures, and regeneration pressure; and a microprocessor programmed to calculate the quantity of purge required to regenerate the adsorbent bed off-stream for regeneration; calculate the purge flow rate; and, based on these calculations, control the regeneration time so that purge flow ceases when the adsorbent bed has been regenerated; control means for controlling the cycling time; and switch the adsorbent beds at the end of each cycle period; and at least one exhaust flow control valve for reducing exhaust gas noise and flow at the start of depressurization comprising a valve element in the form of a conical helically coiled wire spring having an open central passage therethrough, whose sides are defined by the sides of the coils, with a critical orifice disposed in the passage, and movable under exhaust gas pressure between an expanded open position in which gas can flow between the spring coils and a compressed closed position with the coils collapsed and in contact with each other, closing off the sides of the passage and compelling all flow through the passage to pass through the critical orifice, thereby reducing flow and exhaust noise at the start of depressurization, gradually bleeding off gas via the orifice, reducing exhaust gas pressure, and allowing the spring gradually to expand into a fully open position. The system is particularly applicable to the drying of gases.

While the apparatus of the invention can be composed of three or more desiccant beds, the preferred apparatus employs a pair of desiccant beds, disposed in appropriate vessels, which are connected to the lines of reception of influent gas to be fractionated, and delivery of effluent fractionated gas.

The apparatus can also include a check valve or throttling valve for the purpose of reducing pressure during regeneration, and multiple channel valves for cycling the flow of influent gas between the beds and for receiving the flow of effluent gas therefrom. In addition, a metering or throttling valve can be included to divert a portion of the dried effluent gas as purge in counterflow through the bed being regenerated.

Optionally, the apparatus in accordance with the invention can include one or a plurality of means in the bed for detecting the arrival of the moisture front therein at a point in the bed sufficiently distant from the effluent end thereof to enable termination of a cycle before the front can leave the bed, as described in U.S. Pat. No. 3,448,561, to Seibert et al., the disclosure of which is hereby incorporated by reference.

Optionally, the apparatus can also include means for applying heat during such regeneration. Such means can extend to the entire bed or to only that portion of the sorbent bed having a high moisture content, of the order of 20% of its moisture capacity or higher, at the conclusion of a drying cycle, i.e., to only that portion first contacted by influent flow during a drying or adsorption cycle. In this case, the remainder of the sorbent bed is not heated during regeneration, and consequently no heating means are provided therein. The unheated proportion of the bed volume can accordingly be as large as desired. Usually from one-fourth to three-fourths of the bed volume, preferably from one-third to two-thirds of the volume, will be heated.

In effect, the unheated portion of such a bed constitutes a reserve bed, which in the normal drying cycle may not be required at all, and in which in any case the sorbent is apt to adsorb only a relatively small proportion, less than 20%, of its capacity of moisture, but which is present in order to prevent the delivery of effluent gas of undesirably high moisture content in the unlikely event that moisture is not sufficiently adsorbed in the portion of the bed provided with heating means. The moisture-adsorbing capacity of the reserve portion of the bed is so little used that the reserve sorbent is regenerated by the purge flow, whether or not the purge flow is heated, and any moisture carried forward from this portion by purge flow therethrough is of course effectively removed from the bed after passage through the heated portion thereof.

Another embodiment of the apparatus of the invention utilizes a microprocessor system comprising temperature and pressure transducers, a data acquisition module, an input and output module, a microprocessor, and memory storage. Any type of microprocessor can be used, including main frame computers, microcomputers, and minicomputers using a microprocessor central processing unit.

A. Examples of microprocessors:
1. Rockwell International—STC Universal Controller Module
2. Heurikon Corporation—MLP-8080 Microcomputer
3. Intel Corporation—SBC 80/20 Microcomputer or 8080A Microprocessor
4. Motorola, Inc.—Micromodule 1A microcomputer MC6800 Microprocessor
5. National Semiconductor—BLC 80-10 or INS80-80A
6. Synertek—SY6502 Microprocessor
7. Zilog—Z80 Microprocessor B. Examples of memory storage:
1. National Semiconductor—BLC 416/8432
2. Motorola Inc.—Micromodule 6
3. Intel—SBC016

C. Examples of power supply:
1. National Semiconductor—BLC665
2. Motorola, Inc.—PLT820

D. Examples of Input/Output Modules:
1. National Semiconductor—BLC 104/116
2. Intel—SBC519

E. Examples of Data acquisition modules:
1. National Semiconductor—ADS1216HC
2. Intel—SBC711 Analog Input Board F. Examples of Visual Displays:
1. National Semiconductor—NSB5882
2. Litronix—DL-1416
3. Monsanto—MAN6710

G. Examples of pressure transducers:
1. National Semiconductor—LX0603D and LX0603GB LX1601D and LX1730A
2. Cognition, Inc. (Div. of Emerson) dP6130, aP6030, and gP6230

H. Examples of temperature transducers:
1. National Semiconductor—LM334H, LM334Z and LM134H
2. Analog Devices—AD590J, AD590K and AD590L The load of first gas on the sorbent built up in the course of the adsorption portion of the cycle depends upon the content of first gas in the second gas, which may be variable, gas flow rate, and inlet and outlet temperature and pressure. If however during the regeneration portion of the cycle the bed is fully regenerated, the loading does not matter, provided the concentration front of first gas in the bed does not break out of the bed. Accordingly, the cycling time can be fixed at the longest time at which one can be sure, under the operating conditions, that the front has not broken out of the bed, with complete utilization efficiency and optimum energy conservation.

Consequently, a microprocessor-controlled gas fractionator in accordance with the invention operates under a fixed time cycle, while purge regeneration flow is varied within the fixed cycle length, and automatically adjusted according to the degree of loading. The result is that a regeneration cycle is terminated when it is necessary to do so, and unnecessarily extended regeneration of the sorbent is eliminated. At the same time, the volume of purge lost during each cycle is kept to an absolute minimum. In effect, such a gas fractionator automatically times its regeneration cycle according to the demand made upon it by the first content of the influent gas, and can be referred to as a demand cycle fractionator.

The microprocessor monitors the following operating conditions to acquire the information needed on the dryer operation to control the length of the regeneration cycle. Typical locations for the sensing devices are shown in the drawings.

1. Inlet flow rate—This can be sensed either by a differential pressure transducer sensing the loss through a device of known resistance, or by two pressure transducer signals, one from either side of the device (as shown in FIG. 2, $P_1 + P_2$ or equivalent).

2. Inlet pressure—This can be sensed by a pressure transducer ($P_1$ in FIG. 2).

3. Purge pressure—This can be sensed by a pressure transducer ($P_3$ or $P_4$ in FIG. 2).

4. Regeneration pressure—This can be sensed by a pressure transducer ($P_4$ or $P_3$ in FIG. 2).

5. Temperature of the gas mixture at the inlet to the sorbent bed on the adsorption cycle ($T_1$, $T_3$ in FIG. 2).

6. Temperature of the gas mixture at the outlet of the sorbent bed on the adsorption cycle ($T_2$ in FIG. 2 or optionally at a point within the bed $T_2'$ in FIG. 2).

7. Temperature of the purge gas at the inlet to the sorbent bed on regeneration cycle ($T_2$ in FIG. 2 or optionally at a point within the bed $T_2'$ in FIG. 2).

8. Temperature of the purge gas at the outlet to the sorbent bed on the regeneration cycle ($T_3$, $T_1$ in FIG. 2).

These can be sensed by a temperature transducer, thermocouple, thermistor or RTD sensor.

In addition to the above, the following operating conditions can also be monitored:

9. Outlet pressure of effluent gas.

10. Purge exhaust pressure.

11. Outlet effluent gas dewpoint—This can be sensed by a moisture sensing probe connected to the outlet line. A single pressure transducer and a single temperature transducer may be used with an alternating signal device rather than using individual pressure and temperature transducers. The microprocessor would then control the signalling device to obtain the necessary inputs.

The microprocessor with the above information on operating conditions can calculate the required purge time using the equation:

$$tp = \frac{tfQfCpSg^{3/2}T_2^{\frac{1}{2}}(P_4 - e^x)(T_2 - T_1)F_1}{P_3 do^2 e^x}$$

The equation for Tp is a combination of the following two equations:

$$Tp = \frac{Qf}{Qp} Tf \times \frac{(P_4 - e^x)Mg}{18 \times e^x} \times (T_2 - T_1) \times \frac{Cp}{qab \times F}$$

and $$Qp = 86.1933 \, Kf \times do^2 \times Y \times P_3 \, (T_2 \times S.G)^{-\frac{1}{2}}$$

where $$F_1 = 29/(18 \times qab \times F \times 86.1933 \times Kf \times Y)$$

The equation for Qp is a standard equation for flow through an orifice.

$$x = (a/T_3) + (b \, LnT_3) + C$$

where:
tp = required purge time, minutes.
tf = adsorption time, minutes (normally 2 or 5 minutes).
Qf = inlet flow rate, SCFM.
Cp = specific heat, BTU/°F-lb (0.240 for air).
Sg = specific gravity relative to air (Sg = 1.0 for air).
$T_3$ (or $T_1$) = purge exhaust temperature, °Rankine.
$P_4$ (or $P_3$) = regeneration pressure, PSIA.
$T_2 T_1$ (or $T_3 T_4$) = sorbent bed temperature rise, °Rankine.
$T_2$ (or $T_4$) = purge temperature, °Rankine.
$P_3$ (or $P_4$) = purge pressure, PSIA.
do = purge orifice diameter, inches.
$F_1$ = constant of proportionality.
a, b and c = °Rankine formula constants.

The value of $e^x$ can be calculated either from Rankine's formula as shown, or from Young's formula. The values can also be found in Keenan and Keyes, Thermodynamic Properties of Steam, vapor pressure vs. temperature ($T_3$).

Rankine formula: $Pv = e^{[50.9195 - \frac{12034}{t} - 4.6576 \, ln t]}$

Young's formula: $Pv = e^{[16.70 - \frac{9380}{t}]}$ $T = $ °Rankine

An alternate equation for the required purge time that does not take into account changes in humidity is:

$$tp = \frac{tfQfP_1(SgT_2)^{\frac{1}{2}}F_2}{do^2 P_4 P_3}$$

where:
tp = required purge time, minutes.
tf = adsorption time, minutes.
Qf = inlet flow rate, SCFM.
$P_1$ = inlet pressure, PSIA.
Sg = specific gravity relative to air.
$T_2$ (or $T_4$) = purge temperature, °Rankine.
do = purge orifice diameter, inches.
$P_4$ (or $P_3$) = regeneration pressure, PSIA.
$P_3$ (or $P_4$) = purge pressure, PSIA.
$F_2$ = constant of proportionality.

It may be noted that, assuming two sorbent beds I and II (as in FIG. 1) the above references to temperature and pressure apply when bed I is on the adsorption cycle and bed II is on the regeneration cycle, as follows:
$T_1$ = inlet temperature.
$T_2$ = outlet temperature.
$T_3$ = purge exhaust temperature.
$P_3$ = purge pressure.
$P_4$ = regeneration pressure.

After changeover, when bed II is on the adsorption cycle and bed I is on the regeneration cycle, the designations change as follows:
$T_3$ = inlet temperature.
$T_4$ = outlet temperature.
$T_1$ = purge exhaust temperature
$P_4$ = purge pressure.
$P_3$ = regeneration pressure.

The microprocessor calculates inlet flow rate using the equation:

$$Qf = C[(P_1 P_2)P_1 Sg/T_1]^{\frac{1}{2}}$$

where:
QF=inlet flow rate, SCFM.
$P_1$, $P_2$=pressure loss, PSID.
$P_1$=inlet pressure, PSIA.
Sg=specific gravity relative to air.
$T_1$=inlet temperature, °Rankine.
C=flow constant.

The microprocessor can then calculate energy saved per cycle according to the following equation:

$$KW - HR \text{ per } tf = [Qdtf\frac{Pd}{14.7} - tpdo^2P_3G(\frac{sg}{T_2})^{\frac{1}{2}}]EP_1$$

where:
Qd=design inlet flow rate, SCFM.
tf=adsorption time, minutes.
Pd=design inlet pressure, PSIA.
tp=purge time, minutes.
do=purge orifice diameter, inches.
$P_3$ (or $P_4$)=purge pressure, PSIA.
G=purge orifice constant.
Sg=specific gravity relative to air.
$T_2$ (or $T_4$)=purge temperature, °Rankine.
E=KW−HR/SCF−PSIA.
$P_1$=inlet pressure, PSIA.

At the end of each adsorption cycle (tf), the microprocessor must close the exhaust valve (D or C in FIG. 1) on the chamber on regeneration (if not already closed). When the pressure in the chamber on regeneration is raised to within 5% of the pressure in the chamber on adsorption ($P_4$ vs. $P_3$), the inlet switching valves must be actuated such that the chamber on adsorption becomes the regenerating chamber and vice versa. The purge exhaust valve must then be opened on the offstream adsorption chamber.

The microprocessor times the purging time, and when the required flow has passed through the chamber on regeneration it closes the exhaust valve.

On start-up from a "cold" condition, the microprocessor must override the purge condition function for 100 drying time periods to provide for sorbent bed conditioning.

The microprocessor can fulfill a number of display functions, as desired, and can indicate the following data on separate or single visual digital display units, on command from one or several push buttons.

1. Inlet flow rate in SCFM=instantaneous reading.
2. Inlet pressure in PSIG=instantaneous reading.
3. Inlet temperature in °F=instantaneous reading.
4. Energy savings=total cumulative value.

The microprocessor can also fulfill a number of alarm functions, as desired.

The controller can close two alarm circuits, in the event that either bed fails to switch over at the programmed time.

The controller can close two alarm circuits in the event the outlet moisture sensor detects an excessively high concentration of first gas in the gaseous effluent (in a drying system, dewpoint (humidity) in the gaseous effluent).

The controller can also close two alarm circuits in the event that a sensor fault is detected.

Additional functions for the microprocessor include:
(a) Varying drying time (tf) dependent upon flow rate and required outlet dewpoint.
(b) Incorporation of an automatic shutdown program with compressor interlock.
(c) Discontinuance of drying cycle with no outlet flow.
(d) Visual display of total daily air inlet flow.

Typical circuitry for the above functions is shown in FIG. 2.

Preferred embodiments of the apparatus of the invention are illustrated in the following drawings, in which:

FIG. 8 is a side view of the outlet valve assembly of FIGS. 6 and 7, partly in section;

FIG. 10 is a detail top view partly in section of the outlet valve assembly of the computer controlled dryer of FIG. 2;

FIG. 11 is an end detail view in longitudinal section of the outlet valve assembly of FIGS. 9 and 10;

FIG. 12 is a detail view in longitudinal section of the dump valve assembly of the dryer of FIGS. 1 and 2 and FIG. 13 is a detail cross-sectional view of the dump valve assembly of FIG. 12, taken along the line 13—13 of FIG. 12.

Figure 1:
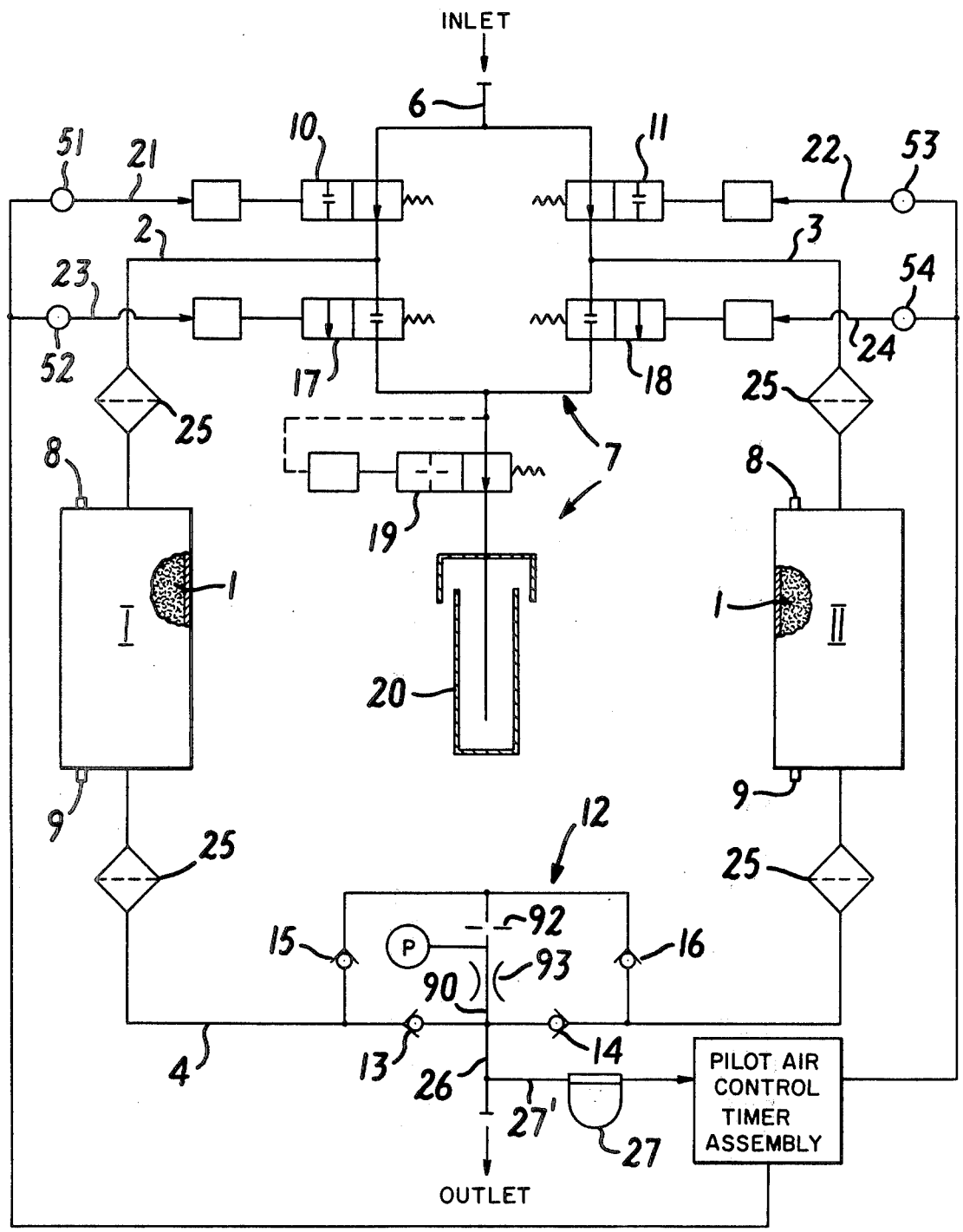
FIG. 1 is a schematic view of one embodiment of a two-bed downflow heatless desiccant dryer in accordance with the invention in which the cycling is controlled by a fixed-cycle timer.

The dryer of FIG. 1 is composed of a pair of desiccant tanks I and II. These tanks are disposed vertically. Each tank contains a bed 1 of desiccant such as silica gel or activated alumina. Also provided in tanks I and II are desiccant fill and drain ports 8, 9 for draining and filling of desiccant in the tanks.

At the top and bottom of each tank is a removable desiccant support screen 25 made of perforated metal cylinder, retaining the desiccant bed 1 in the tanks I and II. This acts to retain any desiccant particles that might otherwise be carried out from the bed 1 past the desiccant screen support 25, to keep the outlet valves 13, 14 and the remainder of the system clean of such particles.

The inlet line 6 conducts influent gas containing moisture to be removed to the distributing manifold 7 containing inlet valves 10, 11 which control influent gas flow of tanks I and II. The manifold 7 also includes exhaust valves 17, 18, dump valve 19 and muffler 20, through which purge flow is vented to atmosphere.

Lines 2, 3 and 4, 5 connect the two tanks at top and bottom, respectively, for introduction of influent gas from and for delivery of dry effluent gas, freed from moisture after having passed through the tanks, to the outlet manifold 12 containing outlet valves 13, 14 and purge flow valves 15, 16 for controlling purge flow and effluent flow to and from each tank.

From outlet manifold 12 extends the dry gas effluent delivery line 26 for delivery of dried effluent gas to the system being supplied therewith. In the line 26 there can be placed an outlet pressure gauge and a humidity sensor, but these are optional, and can be omitted.

One of valves 10, 11 (the other being closed) directs the flow of influent gas to one of two inlet lines 2 and 3, one of lines 2,3 always leading the influent gas to the top of each tank I, II, and the other of lines 2, 3 according to exhaust valves 17, 18 (the other of the exhaust valves being closed) leading the purge flow of regenerating effluent gas to the exhaust valve 19 and muffler 20 for venting to atmosphere. The gas on the adsorption cycle proceeds by downflow through each tank.

One of lines 4, 5 always lead effluent gas from the bottom of each tank I, II, and the other of lines 4, 5 according to the position of valves 10, 11 always leads purge flow of effluent gas to the bottom of each tank I, II for regeneration. The outlet valves 13, 14 are leaf-spring-loaded check valves opening according to differential pressure thereacross between lines 4, 5 and the outlet line 26. Valves 15, 16 are conventional ball check valves. Valves 10, 11, 17 and 18 are operated by the timer control, but valves 13, 14, 15, 16 are pressure operated, the leaf-spring loaded disc or ball being opened or displaced on switching and start-up of on-stream forward flow in line 4, 5, with the other one of the leaf-spring valves 13, 14 and ball valves 15, 16 at such switching time moving against its seat, the valve 13 or 14 closing off the line leading to the chamber undergoing regeneration at reduced pressure, and thus directing main effluent flow to the outlet line 26, while purge flow proceeds via the ball check valve 15, 16 and thence via line 4 or 5 to the chamber I or II, now in the reverse direction, in upflow.

The dryer has only four timer-actuated valves: inlet valves 10, 11 and exhaust valves 17, 18, all in the inlet manifold 7. All other valves are system differential-pressure actuated, and are thus automatic according to gas flow, as provided through the inlet manifold 7 via valves 10, 11, 17, 18.

Each of the inlet valves 10, 11 is of the semi-automatic positive flow type, in that inlet air pressure differential in the normal flow direction will open the valve in the absence of timer-controlled gas pressure applied from lines 21, 22, respectively, according to the open or closed position of solenoid valves 51, 53, operated by the timer assembly. Each of the exhaust valves 17, 18 is of the opposite semiautomatic type, in that inlet air pressure differential in the normal flow direction keeps the valve closed in the absence of timer-controlled gas pressure applied from lines 23, 24, respectively, according to the open or closed position of solenoid valves 52, 54, operated by the timer assembly. Thus, exhaust of gas pressure in lines 21, 22, 23, 24 results in valves 10, 11 being open and valves 17, 18 closed. It is therefore up to the timer to actuate the closing of valves 10, 11 and the opening of valves 17, 18 for purge flow. However, only one of valves 10, 11 and only one of the valves 17, 18 is open at any given time.

Figure 4:
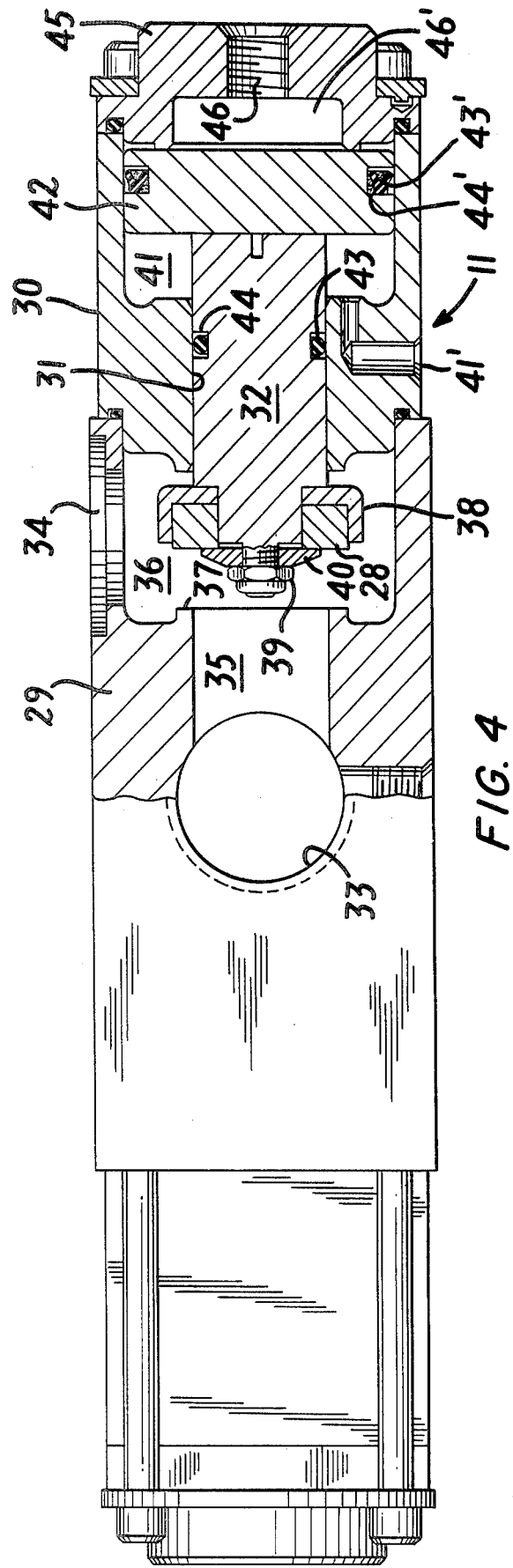
FIG. 4 is a detail view in longitudinal section of an inlet air differential pressure valve assembly in the inlet manifold of the dryers of FIGS. 1 and 2.

The inlet valve 11 is best seen in FIG. 4 (valve 10 is identical, but facing in the opposite direction) and comprises a tubular valve housing 30 with a central bore 31, within which reciprocates a valve piston 32. The inlet manifold housing 29 is provided with an inlet port 33 (connected to line 6) and an outlet port 34 (connected to line 3) interconnected by the through passage 35, which is a continuation of the bore 31 in housing 30. The valve passage 35 and outlet port 34 are in flow communication with the valve chamber 36, a reentrant portion 37 of which at the periphery of the bore 35 constitutes a valve seat, against which seats resilient seal ring 28, captured by the annular cap 38 and retained at the narrowed end of the piston 32 by the nut 39 and washer 40. Upon reciprocation of the piston against the valve seat 37, the real ring 28 provides an effective seal, closing off the passage 35 and interrupting flow communication between the inlet 33 and outlet 34, and thus lines 6 and 3.

The housing 30 is threaded into the chamber 36, which thus also serves as a socket.

At the opposite end of the piston 32 in housing 30 is another valve chamber 41, defined by an enlarged portion of the bore 31, and the cap 42 attached to the end of piston 32 slides within this chamber 41. The O-ring seal 43 in recess 44 of the piston 32 provides a leak-tight seal with the bore 31, and thus there is no flow communication between the chambers 36, 41. U-cup seal 42' in recess 44' of cap 42 provides a leak-tight seal that precludes flow communication between chamber 41 and port 46.

The outlet end of the chamber 41 is closed off by the cover 45, which threads into the housing, and limits the outward movement of the piston 32 and its cap 42. Through the cover 45 is a port 46, which is in flow connection with line 22, through which from time to time the control timer applies gas pressure to the outer face of the cap 42 by opening valve 51. Such pressure has its origin in the dry gas effluent line 26, tapped via line 25' and filter 27.

Upon application of sufficient gas pressure overcoming the pressure within the chamber 36 via line 22 and port 46 into the chamber 46' to the cap 42, the piston 32 is driven to the left, closing the valve.

One of the valves 10, 11 is always in the open position while the other is held the closed position by timer-applied air pressure, so as to direct the influent gas to one of the two tanks I, II via influent lines 2, 3. Thus, gas pressure is always being applied to one of the valves 10, 11, via one of lines 21, 22, while the other line is open to the atmosphere, and therefore the valve remains open while gas pressure in passage 35 is above atmospheric, and closes when the force applied to cap 42 in chamber 41 is above the force applied to the piston 32 in passage 35.

Figure 5:
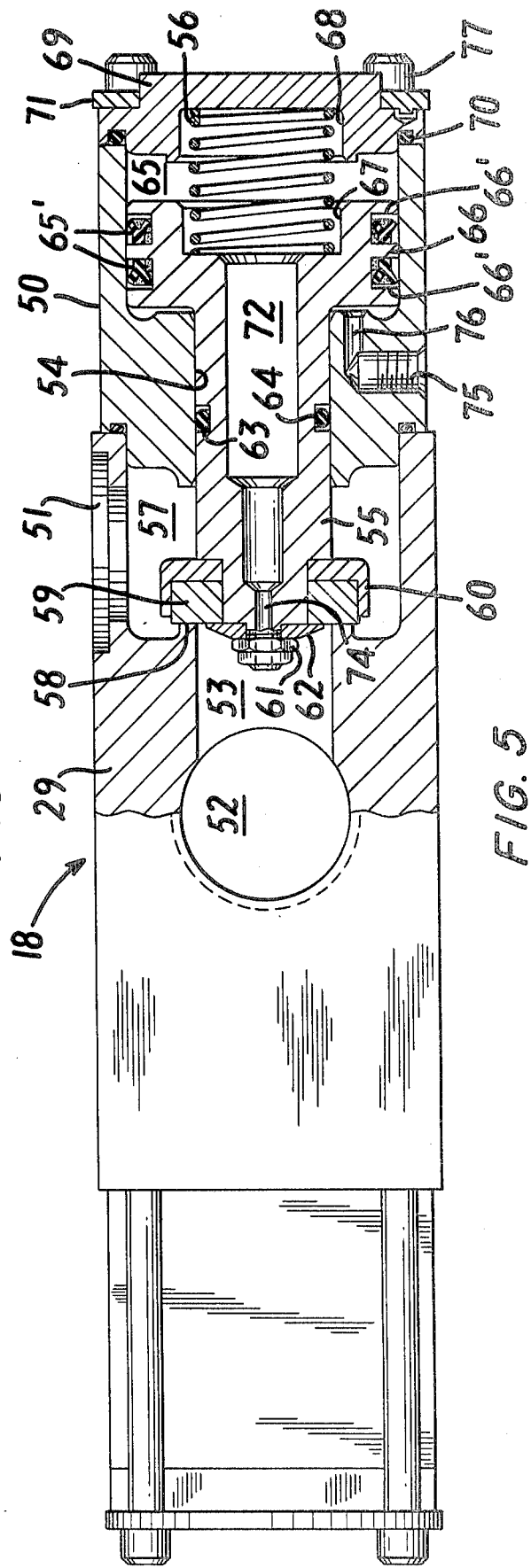
FIG. 5 is a detail view in longitudinal section of an exhaust differential pressure valve assembly in the inlet manifold of the dryers of FIGS. 1 and 2.

The exhaust valve 18 best seen in FIG. 5 (exhaust valve 17 is identical, facing in the opposite direction) is of a similar construction, with the difference that the pressure gas port opens onto the other face of the piston, and therefore serves to open the valve, instead of closing it, while the piston is spring-biased closed. As seen in FIG. 5, the valve includes a tubular housing 50, with an inlet port 51, and an outlet port 52, and a flow passage 53 therebetween. The flow passage 53 is a continuation of the through bore 54, within which is mounted a reciprocable piston 55, spring-biased into the closed position shown in FIG. 5 by the coil compression spring 56.

The passage 53 opens into the piston chamber 57, a reentrant portion 58 of the wall of which at the periphery of the passage 53 constitutes a valve seat. The piston 55 has a seal ring 59 captured by the annular cap 60, and held firmly on the narrowed end of piston 55 against the annular cap by the screw nut 61, and washer 62. The seal ring 59 seals against the valve seat 58 with the piston in the closed position, as shown in FIG. 5. The piston has a peripheral recess 63 within which is retained the O-ring seal 64, forming a leak-tight seal against the walls of the bore, and preventing fluid communication between the piston chamber 57 and the piston chamber 65 at the other side of the cap portion 66 of the piston.

The housing 50 is threaded into the open end of chamber 57, and thus attached to the inlet manifold housing 29.

The coil spring 56 is retained at one end within the recess 67 of the cap 66, and at the other end by the reentrant portion 68 of the cover 69, which is threaded onto the housing 50, closing off the end of chamber 65.

The cover 69 is locked against the housing 50 by the clamping ring 71, which is bolted onto the external face of the housing with the gasket 70 therebetween, by bolts 77.

The piston 55 has a through bore 72 extending between passage 53 and chamber 65 and putting them in flow communication, and the cover 69 prevents the chamber 65 and passage 73 from communication with atmospheric pressure. The bore 72 narrows to capillary dimensions at the portion 74 opening into the passage 53.

A third gas port 75 connecting with passage 76 opens into the chamber 65 on the other side of the cap 66, so that pressure applied there tends to drive piston 55 to the right. U-cup seals 65' in recesses 66' seal off the two parts of chamber 65 from each other.

In the normal position of these valves, as shown in FIG. 5, the sorbent bed chamber air pressure at the inlet 51, aided by the compression spring 56, keeps the valve 55 closed, with ring 59 sealed against the seat 58, inasmuch as the valve seat area is greater than the rod area. When the timer opens valve 52, application of gas pressure via the port 75 and passage 76 to the other face of the piston cap 66 in chamber 65 sufficient to overcome both the chamber air pressure and the biasing force of the compression spring 56 will move the valve 55 to the right, and open the valve. Exhausting gas pressure from the port 75 and passage 76 permits the compression spring 56 to close the poppet against the seat.

When the dump valve 19 is closed, due to flow being dumped, back pressure is formed in the exhaust line leading to this valve beyond valve 17, 18. This back pressure would tend to force the exhaust valve poppet 55 into the open position, since this can be of such magnitude as to overcome the biasing force of the spring 56. Consequently, to avoid this the bores 72, 74 through the valve poppet and cover communicate this back pressure to the other side of the piston, so that it is neutralized or counterbalanced, and does not tend to open the valve.

If the exhaust valve 18 has been opened by the application of pressure through the port 75 and passage 76 to the other face of the cap 66, the back pressure acting on the opposite side of the cap 66 is limited in area due to the dimensions of the valve cover and recess 68, which offer a surface area less than that on the other side of the cap 66. Thus, the back pressure does not overcome the effect of pressure via the port 75, 76, and the valve remains in the open position in this situation.

Figure 6:
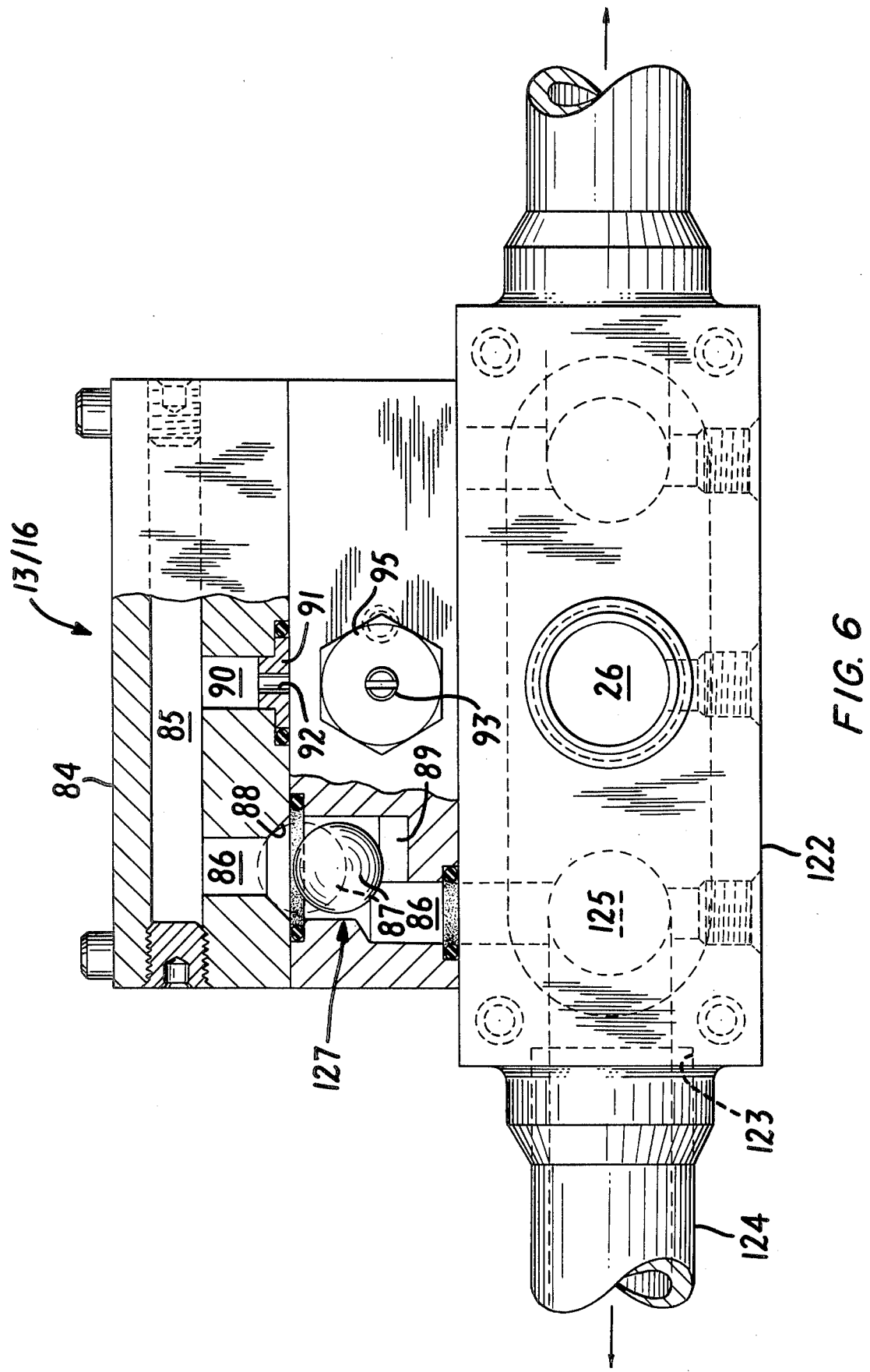
FIG. 6 is a detail view in longitudinal section of an outlet valve assembly of the fixed timer dryer of FIG. 1, viewed from the rear of the dryer.
Figure 7:
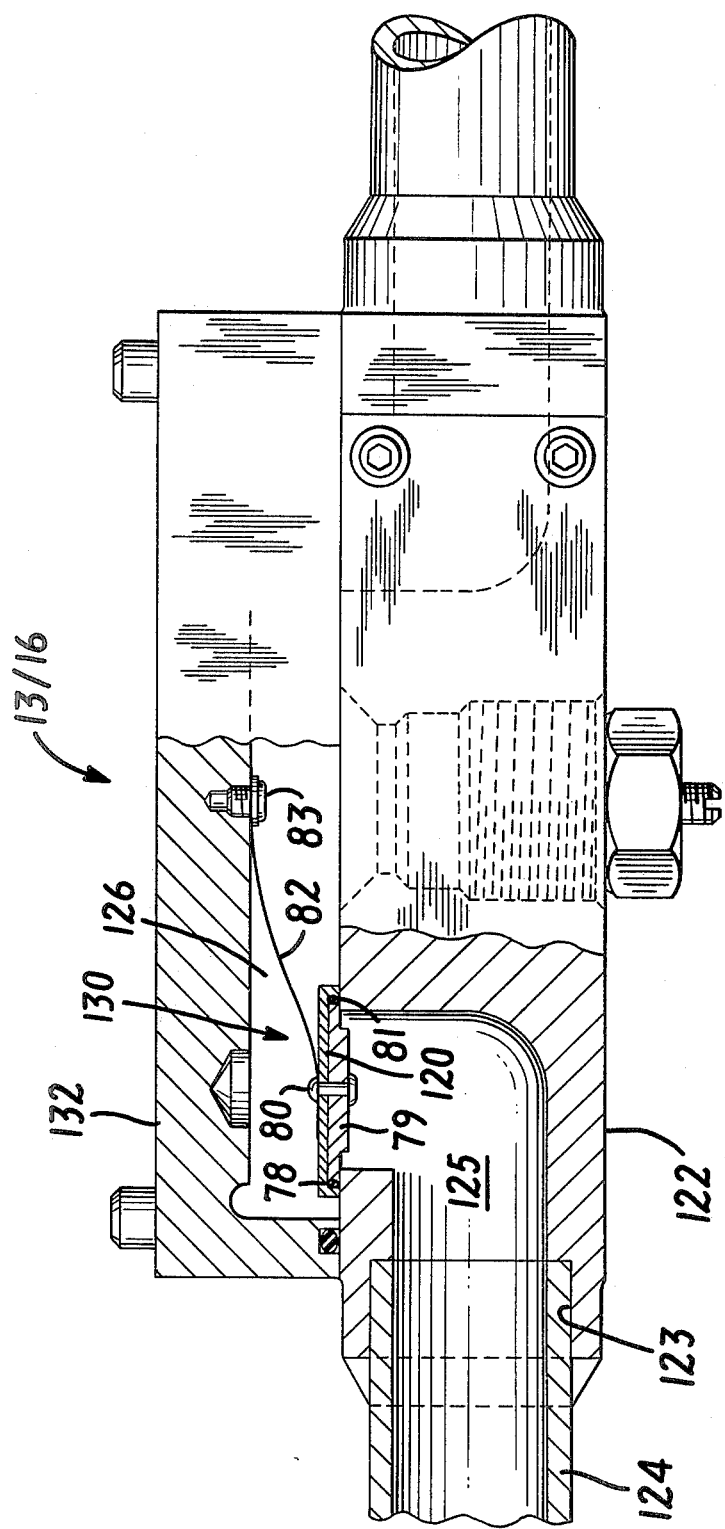
FIG. 7 is a top view of the outlet valve assembly of FIG. 6, partly in section.

The outlet valve assemblies 13, 14 seen in FIGS. 6, 7 and 8 (only 13 is shown; 14 is identical, but on the opposite side of the housing) comprise leaf spring-loaded disks 130, best seen in FIG. 7, acting as check valves, compelling unidirectional flow of dry effluent gas to the outlet, ball check valves 127 compelling unidirectional purge flow, and stem valve 93 controlling the amount of purge flow.

The valve assembly comprises a housing 84 which shelters all these valves and as seen in FIG. 1 constitutes an outlet line manifold. The leaf-spring valves 130 are a part of the valves 13, 14 controlling flow to the effluent gas line 26, and the ball check valves 127 are a part of the valves 15, 16 controlling purge flow communicated directly to whichever of lines 4, 5 leads to the low pressure chamber undergoing regeneration. Stem valve 93 controls effluent gas flow withdrawn from the effluent for purge flow regeneration. The valves 13, 14 open only when upstream pressure via line 4 or 5 from chamber 1 or 2 is greater than downstream pressure in the effluent line 26 or the other of lines 5 and 4 leading to the low pressure chamber being regenerated. At other times, they remain closed. Accordingly, they open only when the chamber before line 4 or 5 is on-stream for adsorption.

The housing 122 has inlet port 123 receiving the line connection 124 (connected with line 4) communicating with flow passage 125 in the housing. The passage 125 leads directly to the cross passage 126, at each end of which is a leaf spring disk valve 130 allowing flow from passage 125 to passage 126, but not in the reverse direction.

The leaf spring disc valve 130 has an inverted receptacle 120 defining a recess 78 with a valve plate 79 retained to the receptacle 120 by the rivet 80 and with an O-ring 81 captured between the outer periphery of the plate 79 and the inner periphery of the receptacle 120 so as to form a leak-tight seal when the valve disk as shown in FIG. 6 is retained against the valve seat 85 at the peripheral edge of the passage 125 where it joins passage 126. The valve is retained in this position, as shown in FIG. 7, by the leaf spring 82, one end of which is held in the wall of passage 126 by the screw 83, and the other end of which is retained by the rivet 80 against the exterior face of the receptacle 120, in a manner such that the spring 82 biases the valve disk against the seat.

Upon a sufficient pressure differential across the valve disk between passages 125 and 126, due to high pressure in passage 4, as compared to downstream gas effluent pressure in passage 126 and line 26, exceeding the predetermined biasing force of the leaf spring 82, the valve is thrust away from the valve seat, opening the passages 125, 126 to flow of gas from the line 4 or 5 to the effuent gas line 26.

Unidirectional purge flow is ensured by the ball check valve 127, best seen in FIG. 6. (The drawing shows valve 16; valve 15 is identical at the other end.) This valve is housed in another portion 84 of the valve housing 122. The portion 84 has a through passage 85 in flow communication at one end via the passage 86 with the gas flow passage 125 of the housing 122. Across the line of flow of passage 86 before passage 85 is the ball check valve 127, composed of a ball 87 movable towards and away from the valve seat 88 within the chamber 89.

The ball check valve 16 as shown in FIG. 6 is in the open position, which is its position when valve 13 to open. Since its passage 125 leads via port 123 and line connection 124 via the line 5 to chamber II, which is being regenerated, and therefore at lower pressure, the ball check valve assumes this position because the pressure in passages 85 and 86 exceeds the pressure in its passage 125, and thus the valve 16 in this position permits flow for purge purposes to line 5. The ball check valve 15 on the other side of the outlet manifold 12 is in the closed position, however, shown in dashed lines in FIG. 6, because the pressure in its passage 125 exceeds the pressure in the passage 85, and thus purge flow is blocked from passage 86 between passages 125 and 85.

Also in flow communication with passage 85 is a passage 90, with an orifice plate 91 thereacross having a through orifice passage 92 restricting maximum flow in the passage 90 to that which can be accommodated by the orifice 92. This passage leads directly, as seen in FIG. 8, to the effluent gas outlet passage 26 on the other side of the leaf spring valve 130.

Upstream of the orifice plate 91 is a variable position rotatable stem valve 93 (best seen in FIG. 8) which at one end projects outside the housing 84, and is provided with gland nut 95 sealing the stem to the housing 84. The cap embraces the stem valve over a considerable reach, and at its inner portion 94 threads into the socket 96 of the housing 84. The passage 90 at the point where it meets the bore 96 has a dog-leg which is tapered at 97, thus receiving the conical tip of the valve in a tapered seal. Passage 90 is closed off when the stem 93 is rotated fully into the bore, but the valve can be retained at any position intermediate a fully opened and a fully closed position, because of the threaded fit, and in such position restricts the passage at 97 to an annulus between the exterior periphery of the valve and the wall of the passage, thus further restricting flow through the passage 90 to less than that permitted by the orifice 92, if desired.

Gas flow proceeds from the effluent line 26 as seen in FIG. 8, into the passage 90, past the stem valve 93 and the orifice 92 into the passage 85, whence it proceeds through whichever of the ball check valves 127 is open, into one of the lines 4 or 5. In the case assumed previously, this would be line 5, through which such flow would proceed as purge flow to chamber II. It will now be seen that the volume amount and flow rate of this purge flow is controlled by the orifice 92 and the needle valve 93.

Figure 12:
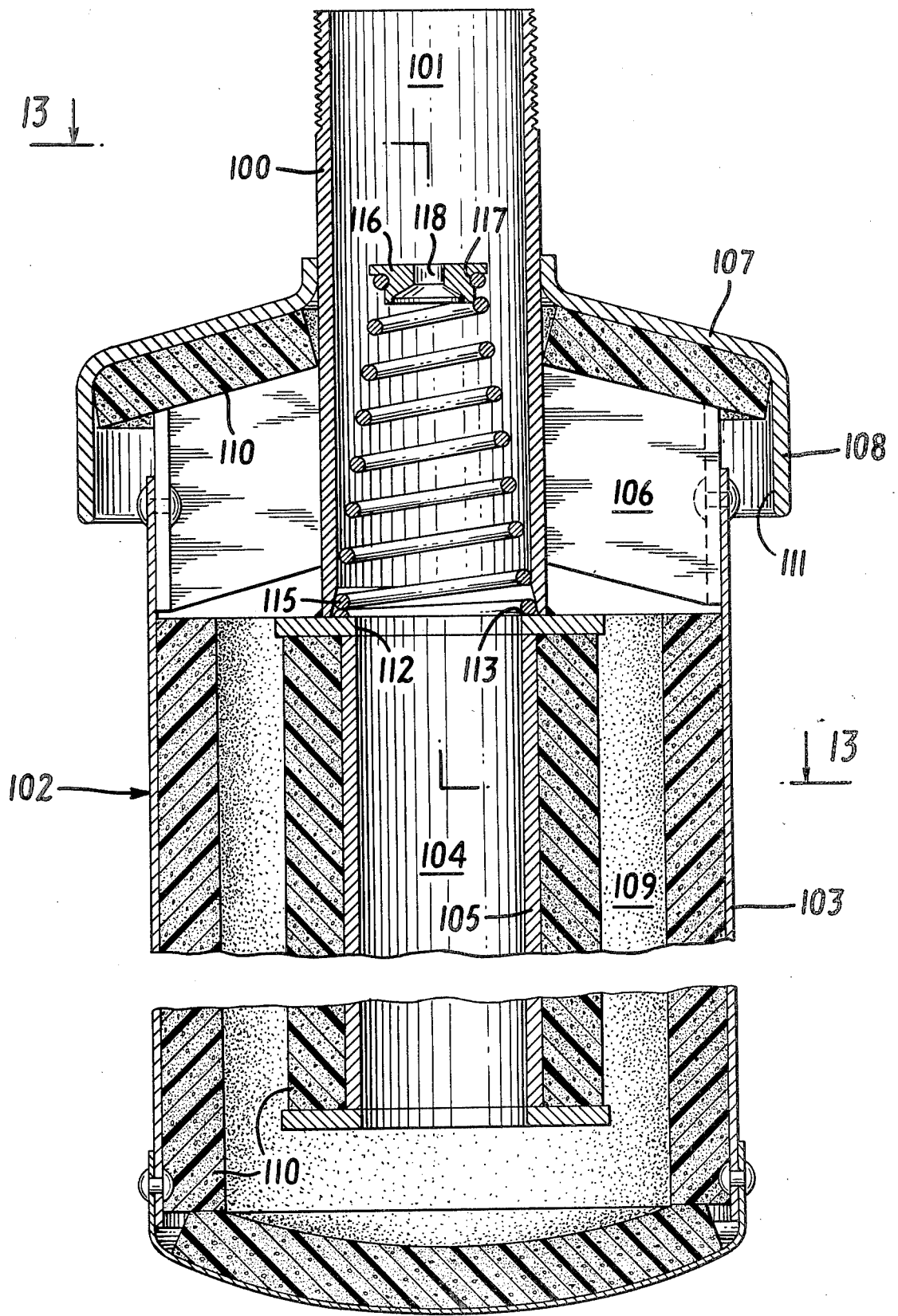

The dump valve, best seen in FIGS. 12 and 13, has a tubular housing 100 with a through passage 101 leading at the upper end, as shown in FIG. 12, from the inlet manifold 7 to a muffler 102 at the other end. The muffler 102 has a bowl portion 103 with a labyrinthine passage 104 extending down the center through tube 105, which is in flow communication with the end of tube 100 and concentric therewith, to the bottom of the bowl 103, whence it turns and continues as annular passage 109 up to the exhaust chamber 106, defined between the upper wall of the bowl 103, the outer wall of the tube 100, and baffle 107, attached to the tube 100 at one end, extending outwardly, and then turned so as to reach partway over the top of the bowl 103 as the shield 108. The walls of the tube 105, bowl 103, and baffle 107 are lined with sound-insulating material 110, such as, for example, a nonwoven mat of mineral wool or glass fibers, or plastic foam material such as polyurethane or polystyrene foam.

Between the upper end of the tube 105 and the lower end of the tube 100 is a retaining plate 111, attached thereto, for example, by welding, brazing or soldering, with a central aperture 112 communicating passages 101 and 104. The upper face of the plate 111 at the periphery of the aperture 112 constitutes a ledge 113, which serves as a support for one end of a conical coil compression spring 115. The spring extends concentrically through the passage 101 for a little over half the length of the tube 100. The final coil of the spring supports an orifice plate 116, the coil being captured in the peripheral recess 117 of the plate. An orifice 118 extends through the plate.

The coil spring and orifice plate together constitute a variable shut-off valve which assumes an infinite number of positions between fully extended open and fully compressed closed position according to the pressure differential across the valve between passages 101 and 104. Inasmuch as passage 104 is open to the atmosphere at the outlet passage 111 between the shield 108 and the bowl 103, at some minimum differential pressure when the pressure in passage 101 above the spring 115 is above atmospheric, the coil spring 115 begins to be compressed, to a greater or lesser extent, according to magnitude of the pressure differential thereacross. Whenever the pressure differential exceeds a predetermined minimum, the spring is fully compressed, and the only opening for gas flow past the spring is via the orifice 118. The orifice 118 accordingly permits a small bleed flow at all times, even in the closed position of the valve. This reduces pressure in passage 101. As the pressure differential decreases, due to removal of gas via the orifice 118, the compression spring 115 gradually extends upwardly, and as it does so, spaces open between the coils thereof, which also permit flow of gas between passages 101 and 104, thus increasing the rate of flow from the upstream side of the valve and increasing the drain of gas, and thus increasing the rate of reduction of gas pressure and decreasing the pressure differential across the valve. Accordingly, the valve with increasing speed continues to open out, and finally reaches the fully-open position shown in FIG. 12.

If the left-hand tank I is on the drying cycle, and the right-hand tank II on the regenerating cycle, then valves 10 and 18 are open, 11 and 17 closed, and the operation of the dryer proceeds as follows: wet gas influent at, for example, 100 psig, and a flow rate of 305 s.c.f.m. saturated at 80° F., enters through the inlet line 6, proceeds into the inlet manifold 7, passes the valve 10 (valve 11 being closed) and enters the top of the first tank I, and passes thence downwardly through the bed of desiccant 1 therein, for example, silica gel or activated alumina, to the bottom of the tank, and thence through line 4, valve 13 to the dry gas outlet line 26. Effluent gas is delivered there at 95 psig and 265 s.c.f.m., dewpoint −40° F. The valve 15 is closed, under pressure differential across the ball 87 between passage 85 and 86, and prevents entry of dry gas into line 5 except via line 90, stem valve 93 and orifice 92. This metered portion of the dry gas effluent, 40 s.c.f.m., is bled off into the line 5 while its pressure is reduced to atmospheric, and then passes through line 5 to the bottom of the second tank II, which is on the regeneration cycle. Purge flow passes upwardly through the desiccant bed 1, and emerges at the top into line 3, and thence passes through valve 18 to the dump valve 19 and through muffler 20, where it is vented to the atmosphere.

Since the time that each bed will be on the drying cycle is normally greater than the length of time required to regenerate the spent bed, the purge exhaust valves 17, 18 are so actuated by the fixed timer via valves 52, 54 and lines 23, 24 that they are opened only for the time necessary to complete regeneration of the desiccant. When this time has elapsed, they are shut off, and the regenerated tank II is then automatically and slowly repressurized with dry effluent gas via lines 90 and 5.

This cycle continues until the fixed cycle time has elapsed, whereupon the fixer timer then actuates solenoid valve 51 and deactuates solenoid valve 53, and thereby switches valves 10, 11 so that wet gas influent metering through the inlet 6 passes through valve line 3 to the top of tank II, while solenoid valve 54 is actuated so that exhaust valve 17 shifts to open line 2 to purge exhaust flow (solenoid valve 52 was closed, so that valve 18 closes to repressurize chamber II). Valve 13 shifts to close line 4, while valve 14 opens so that dry gas effluent can now pass from the bottom of the tank II to the dry gas delivery line 26, while line 4 is closed, except to the flow of purge gas bypassing valve 13 via the lines 90, 85 through valve 15. Purge flow proceeds via line 4 to the bottom of tank I, which is on the regeneration cycle, and thence upwardly through the bed to the line 2, and thence through exhaust valve 17, dump valve 19, and muffler 12, where it is vented to the atmosphere. This cycle continues until the regeneration time cycle is completed, whereupon the fixed timer deactuates solenoid valve 54, and exhausts line 23, so that purge exhaust valve 17 closes. Accordingly, the line 4 slowly repressurizes tank I. The system continues with tank II on the drying cycle until the fixed cycle time has elapsed, whereupon the fixed timer actuates solenoid valves 53, 52 and deactuates valve 51, which reverses valves 10, 11 and 18, and the cycle begins again.

Usually, the drying cycle is carried out with gas at a superatmospheric pressure, of the order of 15 to 350 psig. The orifice 92 and stem valve 93 in the line 90 in combination with the purge exhaust valves 17, 18 and dump valve 19 ensure that the regeneration cycle is carried out at a pressure considerably reduced from that at which the adsorption cycle is effected.

Figure 2:
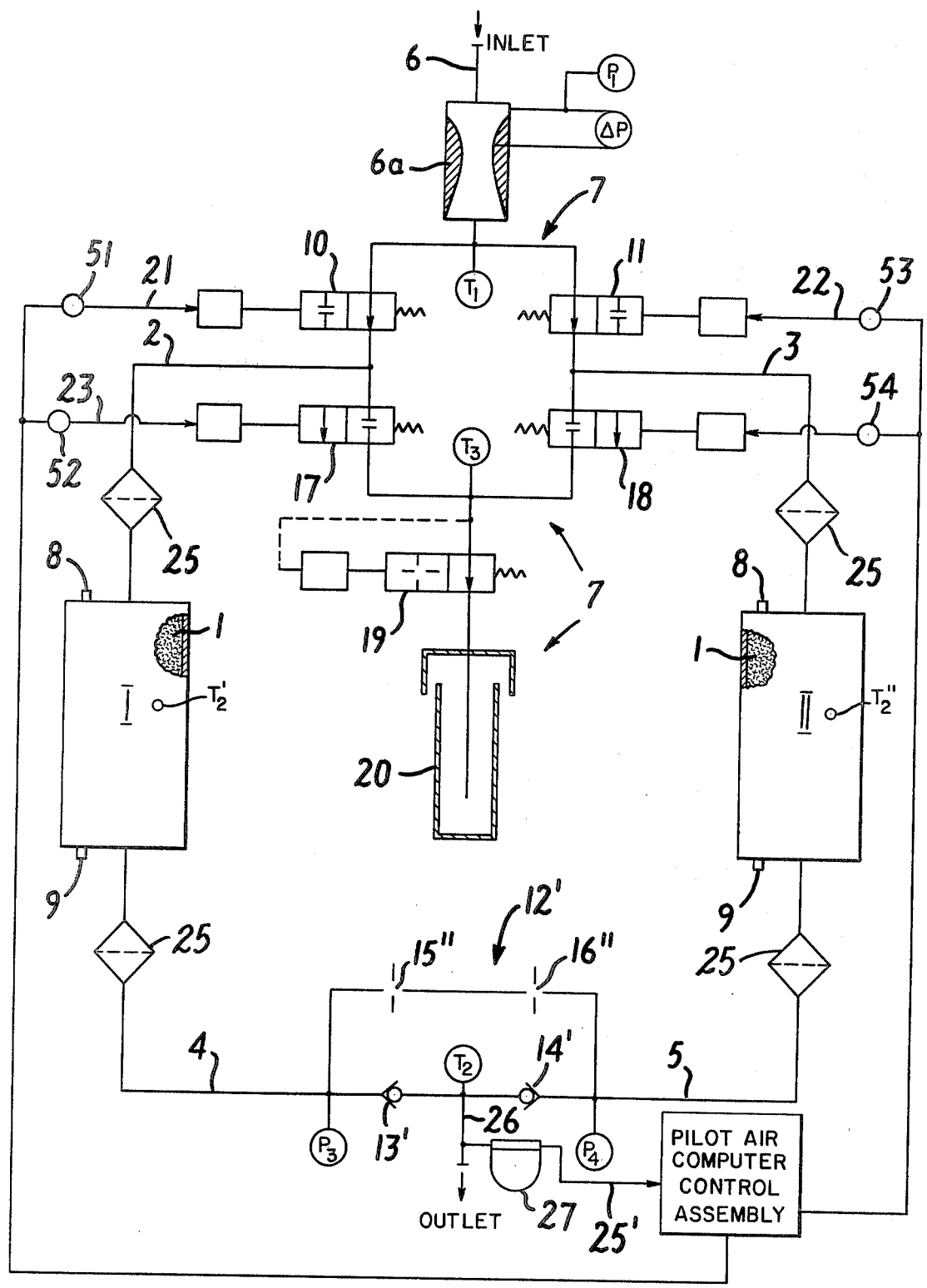
FIG. 2 is a schematic view of another embodiment of two-bed downflow heatless desiccant dryer in accordance with the invention in which the cycling is controlled by a computer.

The microprocessor-controlled dryer of FIG. 2 is generally similar to that of FIG. 1 in most respects, and therefore like reference numerals are used for like parts. The dryer is composed of a pair of desiccant tanks I and II, containing a bed 1 of desiccant such as silica gel or activated alumina. Also provided in tanks I and II are desiccant fill and drain ports 8, 9 for draining and filling of desiccant in the tanks.

At the bottom and top of each tank is a removable desiccant support screen 25 made of perforated metal cylinder, retaining the desiccant bed 1 in the tanks I and II. This acts to retain any desiccant particles that might otherwise be carried out from the bed 1 past the desiccant screen support 25, to keep the outlet valves 13', 14' and the remainder of the system clean of such particles.

The inlet line 6 includes a venturi 6a which has taps at its inlet and at its narrowest point at its center for differential pressure and flow measurement.

Only two lines are required connecting the two tanks I, II at top and bottom, respectively, for introduction of influent gas containing moisture after having passed through the dryer, with the necessary manifolded valves for switching flow of influent and effluent gas to and from each tank. These lines are fitted with sensors to collect and feed information to the microprocessor by the circuitry shown in FIG. 3. This system includes inlet pressure gauge $P_1$ and $\Delta P$-pressure indicator gauge at venturi 6a, temperature sensor $T_1$, at the inlet to the manifold 7, and temperature sensor $T_3$ at the outlet from the manifold 7 to the dump valve 19. Inlet differential pressure gauges inlet flow velocity. This with $P_1$ and $T_1$ indicates gas flow rate $Qf$. In place of the venturi, any other type of flow restriction can be used, such as an orifice nozzle, meter or paddle wheel. Flow rate can also be determined as a function of pressure drop across the desiccant bed 1 or across the inlet valves 10, 11.

Lines 2, 3 and 4, 5 connect the two tanks at top and bottom, respectively, for introduction from the inlet line 6 of influent gas containing moisture to be removed via the distributing manifold 7 containing inlet valves 10, 11 and for delivery of dry effluent gas from the two tanks, freed from moisture after having passed through the dryer, to the outlet manifold 12 containing outlet valves 13' 14' and one pair of purge flow orifices 15" 16", for controlling purge flow and effluent flow to and from each tank. The manifold 7 also includes exhaust valves 17, 18, dump valve 19 and muffler 20, through which purge flow is vented to atmosphere.

The line 6 conducts the moist influent gas from venturi 6a to the manifold 7 and the inlet valves 10, 11. One of valves 10, 11 directs the flow of influent gas to one of two inlet lines 2 and 3, one of lines 2, 3 always leading the influent gas to the top of one of tanks I, II, and the other of lines 2, 3 according to exhaust valves 17, 18 leading the purge flow of regenerating effluent gas to the exhaust valve 19 and muffler 20 venting to atmosphere. The gas proceeds by downflow through each tank. Outlet lines 4 and 5 from the bottom of tanks I and II, respectively, lead to the outlet manifold 12. From outlet manifold 12 extends the dry gas effluent delivery line 26, for delivery of dried effluent gas to the system being supplied therewith. In the line 26 there can be placed an outlet pressure gauge and a humidity sensor, but these are optional, and can be omitted.

According to the position of valves 10, 11 one of lines 4, 5 always leads dry effluent gas from the bottom of each tank I, II to the outlet line 26, and the other of lines 4, 5 always leads purge flow of effluent gas to the bottom of each tank I, II for regeneration. The outlet valves 13', 14' are leaf-spring loaded check valves opening according to differential pressure thereacross between lines 4, 5 and the outlet line 26. Valves 10, 11, 17 and 18 are pilot gas operated, controlled by the microprocessor, but valves 13', 14' are pressure-operated, the leaf-spring loaded disc being opened or displaced on switching and start up of on-stream forward flow in line 4, 5 while the other one of the leaf-spring valves 13', 14' at such switching time moving against the seat, valves 13' or 14' closing off the line leading to the chamber undergoing regeneration at reduced pressure, and thus directing dry gas effluent flow to the outlet line 26, while purge flow proceeds via orifices 15", 16" or 16", 15" to the chamber I or II, now in the reverse direction, in upflow.

Upstream of outlet valve 13' is a pressure sensor $P_3$ and above valve 14' a second pressure sensor $P_4$, and downstream thereof at outlet line 26 a temperature sensor $T_2$. Pressure gauges $P_3$, $P_4$ read off the pressure at the outlet valves 13', 14' and thus give the regeneration pressure in each tank as it is undergoing regeneration, while $T_2$ gives effluent gas temperature.

The dryer has only four microprocessor-actuated valves: inlet valves 10, 11 and exhaust valves 17, 18, all in the inlet manifold 7. All other valves are system differential-pressure actuated, and are thus automatic according to gas flow, as provided through the inlet manifold via valves 10, 11, 17, 18.

Each of the inlet valves 10, 11 is of the semiautomatic positive flow type, in that inlet air pressure differential in the normal flow direction will open the valve in the absence of microprocessor-controlled gas pressure applied from lines 21, 22 respectively according to the open or closed position of solenoid valves 51, 53, operated by the microprocessor. Each of the exhaust valves 17, 18 is of the opposite semi-automatic type in that inlet air pressure differential in the normal flow direction keeps the valve closed in the absence of microprocessor-controlled gas pressure applied from lines 23, 24, respectively, according to the open or closed position of solenoid valves 52, 54, operated by the microprocessor. Thus, exhaust of gas pressure in lines 21, 22, 23, 24 results in valves 10, 11 being open and valves 17, 18 closed. It is therefore up to the microprocessor to actuate the closing of valves 10, 11 and the opening of valves 17, 18 for purge flow. However, only one of valves 10, 11 and 17, 18 is open at any given time.

The inlet valve 11 is best seen in FIG. 4 (valve 10 is identical, but facing in the opposite direction) and reference is made to that description above.

One of the valves 10, 11 is always in the open position while the other is held in the closed position by microprocessor-applied air pressure, so as to direct the influent gas to one of the two tanks I, II via influent lines 2, 3. Thus, gas pressure is always being applied to one of the valves 10, 11, via one of lines 21, 22, while the other line is open to the atmosphere, and therefore the valve remains open while gas pressure in passage 36 is above atmospheric, and closes when the force applied to cap 42 in chamber 41 is above the force applied to the force or piston 32 in chamber 36.

The exhaust valve 18 is best seen in FIG. 5 (exhaust valve 17 is identical, facing in the opposite direction) and reference is made to that description, above. The exhaust valve is of a similar construction, with the difference that the pressure gas port opens onto the other face of the piston, and therefore serves to open the valve, instead of closing it, while the piston is spring-biased closed.

Figure 9:
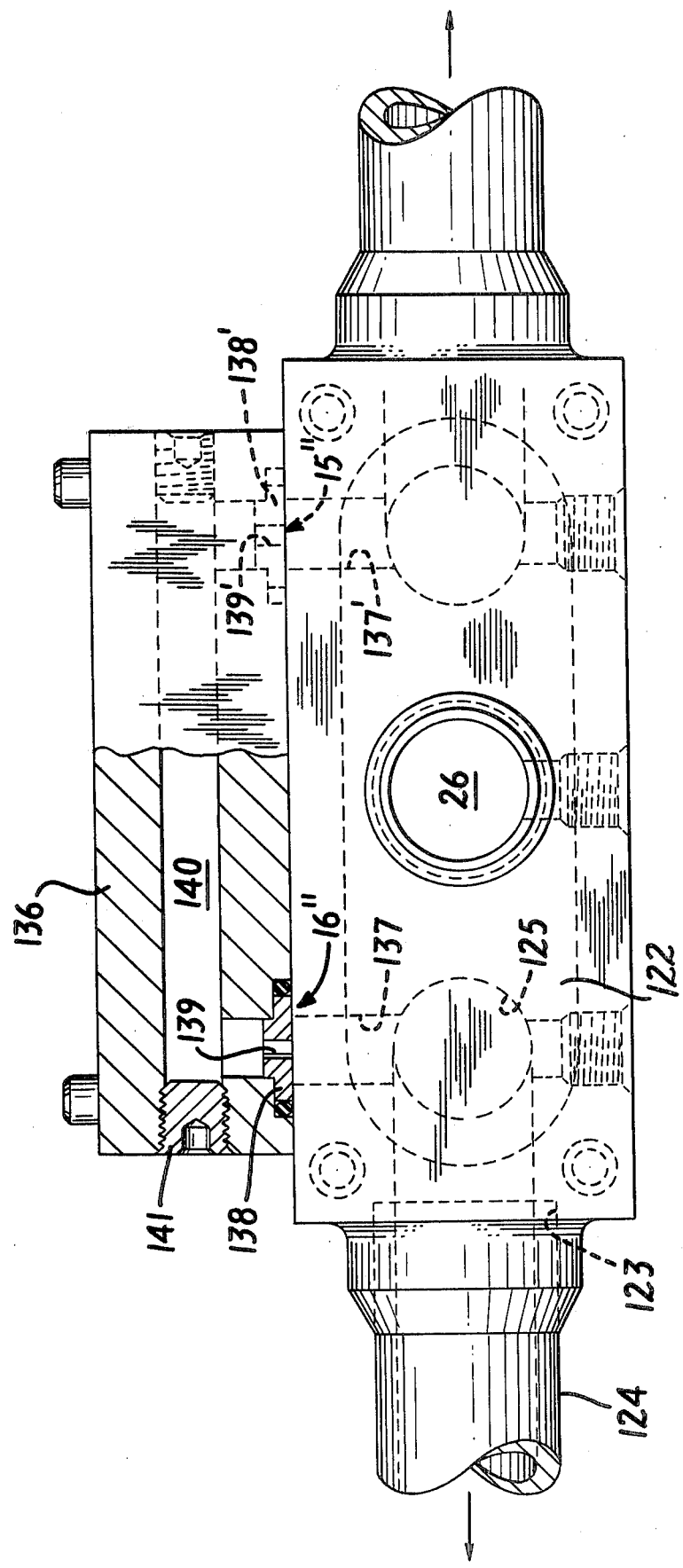
FIG. 9 is a detail rear view, partly in section, of an outlet valve assembly of the computer-controlled dryer of FIG. 2.

The outlet valve assemblies 13', 14' are best seen in FIGS. 9, 10 and 11 (only 14' is shown; 13' is identical, but on the opposite side of the housing). These are similar to those shown in FIGS. 6, 7 and 8, and therefore like reference numerals are used for like parts. These valves comprise leaf spring-loaded disks 130, best seen in FIG. 7, acting as check valves, compelling unidirectional dry effluent gas flow to the outlet. Orifices 15" and 16" control the amount of purge flow.

The valve assembly comprises a housing 132 which shelters both these valves and, as seen in FIG. 2, constitutes an outlet line manifold 12. The leaf spring valve 130 controls flow to the effluent gas line 26, and the orifices 15", 16" control purge flow communicated directly to whichever of lines 4, 5 leads to the low pressure chamber undergoing regeneration. The valves 13', 14' open only when upstream pressure via line 4 or 5 from chamber I or II is greater than downstream pressure in the effluent line 26 or the other of lines 5 and 4 leading to the low pressure chamber being regenerated. At other times, they remain closed. Accordingly, they open only when the chamber before line 4 or 5 is on-stream for adsorption.

The housing 132 has inlet port 123 receiving the line connection 124 (connected with line 4), communicating with flow passage 125 in the housing. The passage 125 leads directly to the cross passage 126 at each end of which is a leaf spring disk valve 130 allowing flow from passage 125 to passage 126, but not in the reverse direction.

The leaf spring valve 130 has an inverted receptacle 120 defining a recess 78 with a valve plate 79 retained to the receptacle 120 by the rivet 80 and with an O-ring 81 captured between the outer periphery of the plate 79 and the inner periphery of the receptacle 120 so as to form a leak-tight seal when the valve disk as shown in FIG. 10 is retained against the valve seat 135 at the peripheral edge of the passage 125 where it joins passage 126. The valve is retained in this position, as shown in FIG. 10, by the leaf spring 82, one end of which is held to the wall of passage 126 by the screw 83, and the other end of which is retained by the rivet 80 against the exterior face of the receptacle 120, in a manner such that the spring 82 biases the valve disk against the seal.

Upon a sufficient pressure differential across the valve disk between passage 125 and 126, due to high pressure in passage 4, as compared to downstream gas effluent pressure in passage 126 and line 26, exceeding the predetermined biasing force of the leaf spring 82, the valve is thrust away from the valve seat, opening the passages 125, 126 to flow of gas from the line 4 to 5 to the effluent gas line 26.

Unidirectional purge flow is ensured by the other leaf spring valve 130 (a part of outlet valve 13') at the opposite end of passage 126, which is closed due to higher pressure in passage 126 than in line 5 and chamber II.

Also in flow communication with passage 125 in housing 136 is a passage 137 with an orifice plate 138 thereacross having a through orifice passage 139 restricting maximum flow in the passage 137 to that which can be accommodated by the orifice 139 and thereby reducing pressure beyond the orifice. The passage 137 leads directly as seen in FIG. 9 to the purge flow passage 140 on the other side of the orifice 139. There is a like orifice plate 138', orifice 139' and passage 137' in flow communication with the flow passage 125 of the outlet valve assembly 13' at the other side of the housing 136.

At each end of passage 140 is a plug 141, closing it off, so that flow through the orifice passage 139 proceeds along passage 140 and then through the orifice 139', passage 137', and passage 125 via port 123 into line 5, undergoing further pressure reduction as it does so, chamber II being at atmospheric pressure when exhaust valve 18 and dump valve 19 are open. Flow proceeds in this way so long as pressure in line 5 and chamber II is below line pressure in line 4 and passage 125.

Accordingly, while this pressure differential can exist purge gas flow proceeds from the line 4 as seen in FIG. 9 into the passage 125, 137, past the orifice 139 into the passage 140, whence it proceeds through the orifice 139', and passage 137', into the line 5. When the pressure differential is in the reverse direction, when the chambers are switched such flow would proceed as purge flow to chamber I via passages 125, 137', orifice 139' passage 140, orifice 139 and passages 137, 125 into line 4. It will now be seen that the volume amount and flow rate of this purge flow is controlled by the orifices 139, 139'.

The dump valve is best seen in FIGS. 12 and 13, and has been described above.

If the left-hand tank I is on the drying cycle, and the right-hand tank II on the regenerating cycle, then valves 10 and 18 are open, 11 and 17 closed, and operation of the dryer proceeds as follows: wet gas influent at, for example, 100 psig, and a flow rate of 305 s.c.f.m., saturated at 80° F., enters through the inlet line 6, passes the venturi 6a and valve 10 (valve 11 being closed) and enters the top of the first tank I, and passes thence downwardly through the bed of desiccant 1 therein, for example, silica gel or activated alumina, to the bottom of the tank, and thence through filter 25 and opening line 4, valve 130 (13′) and proceeding via line 16 to the dry gas outlet line 26. Effluent gas is delivered there at 95 psig and 265 s.c.f.m., dewpoint $-40°$ F. The valve 14′ (the second valve 130) prevents entry of dry gas into line 5 except via passages 137, 137′, orifices 139, 139′, and passage 140. This metered portion of the dry gas effluent 40 s.c.f.m. is bled off through the line 5, its pressure having been reduced to atmospheric on the other side of the orifice 139′, and then passes to the bottom of the second tank II, which is on the regeneration cycle. Purge flow passes upwardly through the desiccant bed 1, and emerges at the top into line 3, and thence passes through valve 18, to dump valve 19, and muffler 20, where it is vented to the atmosphere.

Since the time that each bed will be on the drying cycle is normally greater than the length of time required to regenerate the spent bed, purge exhaust valves 17, 18 are so actuated by the microprocessor that they are opened only for the time necessary to complete regeneration of the desiccant. When this time has elapsed, they are shut off, and the regenerated tank II is then automatically and slowly repressurized via line 5.

This cycle continues until the cycle time determined by the microprocessor or fixed timer has elapsed, whereupon the microprocessor then switches valve 10, 11 so that wet gas influent entering through the inlet 6 passes through the line 3 to the top of tank II while check valve 14′ shifts to open line 5 whereupon check valve 13′ shifts to close line 4, so that dry gas effluent can now pass from the bottom of the tank II to the dry gas delivery line 26, while line 4 is closed, except to the flow of purge gas bypassing valve 13′ via the passage 137′, 137, 140 and orifices 139′, 139 now in the reverse direction. Purge flow proceeds via line 4 to the bottom of tank I, which is on the regeneration cycle, and thence upwardly through the bed to the line 2 and thence through valve 17, valve 19, and muffler 20 where it is vented to the atmosphere. This cycle continues until the regeneration time cycle is completed, whereupon the microprocessor closes purge exhaust valve 17. Accordingly, line 4 slowly repressurizes tank I. The system continues with tank II on the drying cycle until the microprocessor determined or fixed cycle time has elapsed, whereupon the microprocessor reverses valves 10, 11 and the cycle begins again.

Usually the drying cycle is carried out with gas at a super-atmospheric pressure, of the order of 15 to 350 psig. The orifices ensure that the generation cycle is carried out at a pressure considerably reduced from that at which the adsorption cycle is effected.

Figure 3:
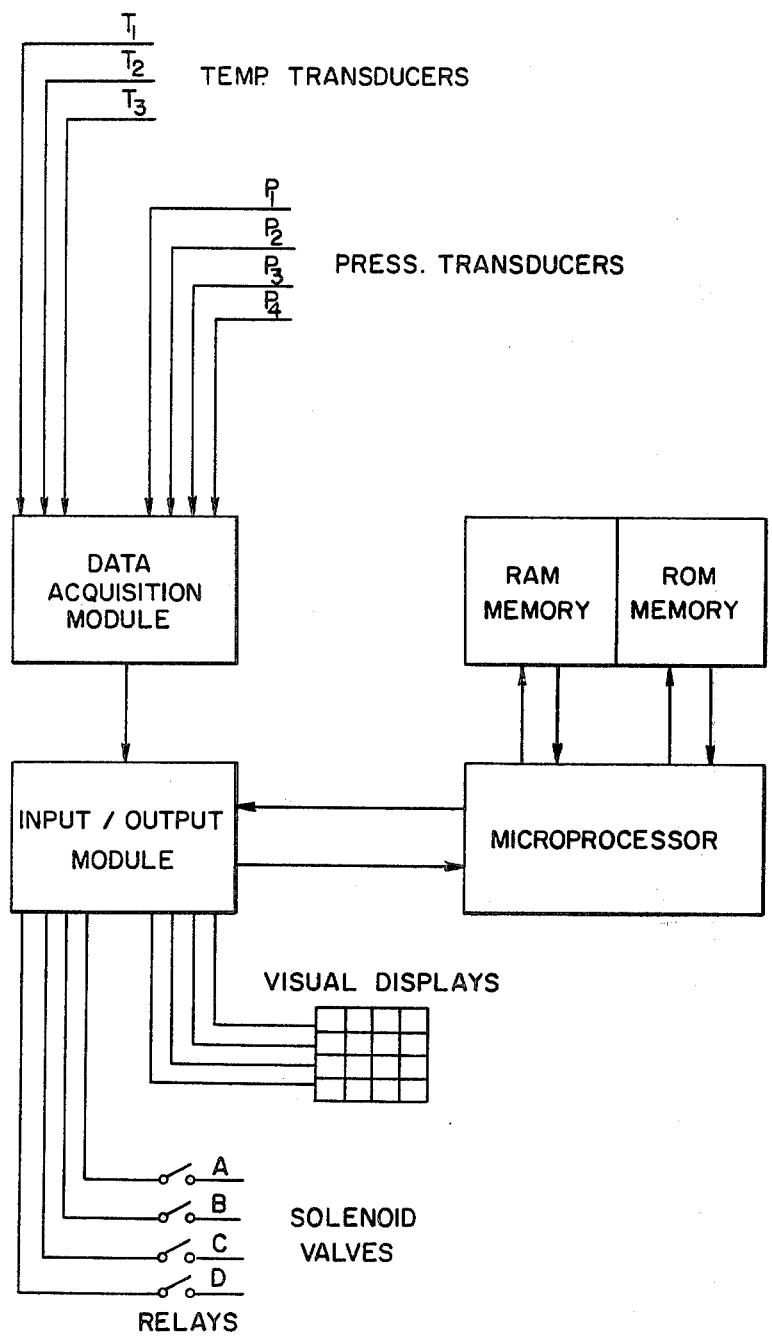
FIG. 3 is a detail view of the microprocessor sensor/control circuit of the heatless desiccant dryer of FIG. 2.

The electric circuit connections for the microprocessor are shown in FIG. 3. The microprocessor includes a data acquisition module, for collecting data from the temperature and pressure transducers, an input/output module for input and output data receipt and control, the microprocessor, and RAM and ROM memory banks for storing the information used in the control function. The inlet pressure sensor $P_1$ also can be used to ascertain flow rate, and the purge and regeneration pressure sensors $P_3$, $P_4$ are connected to pressure transducers, which are connected to the data acquisition module, which is directly connected with the input and output module. The input/output module is also connected with the microprocessor, and this is connected to the memory banks.

The inlet temperature sensor $T_1$, the outlet temperature sensor $T_2$ and the purge temperature sensor $T_3$ are connected to the temperature transducers, which in turn are connected to the data acquisition module.

In addition to these sensors, which are essential, there can also be included an atmospheric pressure sensor, and an outlet pressure sensor $P_5$, all connected to the transducers and data acquisition module.

The alarm system, which is optional, can detect humidity via the humidity sensor H, a failure in any of the inlet manifold valves 10, 11, 17, 18, and failure in any of the sensors, whereupon the microprocessor can signal an alarm. The alarm system is connected to the input/output module.

There is also provision for visual display of the readings sensed by the sensors, and the valves calculated by the microprocessor thereupon, which include, for example, inlet flow rate, inlet pressure, inlet temperature, and the energy saved. These are connected to the input/output module.

Finally, the system control controlling the four valves in the inlet manifold 7 in the form of solenoid valves and relays is connected to the input/output module.

The microprocessor control system shown in FIG. 3 operates as follows:

A. Operating data is transferred to the data acquisition module from the remote pressure and temperature transducers. The signals are converted to digital quantities and passed into the input/output module.

B. The microprocessor orders data from the input/output module and performs calculations on the data based upon the programs contained in the ROM memory. Temporary numbers used in the computations are stored in the RAM memory, or "scratch" pad.

C. At the appropriate times, the microprocessor sends signals through the input/output module to control the system solenoid valve relays.

D. Operating data and "fault" signals are transmitted to the visual displays.

In FIG. 3, the inlet differential pressure, $\Delta p$ indicates the inlet velocity. This plus $P_1$ and $T_1$ yields the inlet flow rate in SCFM.

$P_3$, or $P_4$ and $T_3$, knowing the purge orifice size and gas, are used to calculate the actual purge flow rate in SCFM.

The regeneration pressure and temperature $P_3$ or $P_4$ and $T_2$, are used to determine the amount of water which can be removed by the purge.

$T_2$ less $T_1$ indicates the amount of humidity in the inlet air. Alternatively, $T_2$ may be sensed in the desiccant beds using $T_2'$ and $T_2''$ in tanks I and II.

It is also possible in a variation of FIG. 3 to calculate pressure upstream of the purge orifice knowing the inlet pressure $P_1$, and flow rate and the pressure loss across the system. One less pressure transducer is required with this scheme.

In this case, the pressure transducers $P_3$, $P_4$ are omitted, and replaced by a single pressure transducer $P_6$ in the exhaust line before the dump valve 19 and following valves 17, 18. The temperature transducers remain the same, and also the pressure transducers $P_1$, $P_2$. The pressure transducers $P_6$ determines regeneration pressure at the outlet from the tank undergoing regeneration, in lieu of the inlet, as in the system of FIG. 1.

The microprocessor accurately senses the dryer operating conditions, precisely calculates the required purge flow necessary to thoroughly regenerate a desiccant bed based on the sensed operating conditions, and controls both the dryer cycling time, on a fixed time basis, and the regeneration time based on the calculated purge flow required. As a result, minimal purge gas is consumed and the dryer is more economical to operate than any other type of dehydration system for almost all applications.

In addition to its control functions, the microprocessor may also display the paramount operating data on visual indicators. It also monitors the dryer for correct operation. In the event of a fault condition, the microprocessor diagnoses the fault and displays a flashing coded message on an alarm indicator. Thus, the microprocessor assists in maintaining the dryer system and facilitates troubleshooting.

The following functions are performed by the computer control system:

A. Sensing Dryer Operating Conditions
  Inlet pressure
  Inlet flow rate
  Inlet temperature
  Moisture adsorbed
  Regeneration pressure
B. Calculating Purge
  Purge required for complete regeneration
  Purge flow rate
C. Controlling Dryer Operation
  Switching chambers on a fixed time basis
  Discontinuing purge after passage of required flow
  Reconditioning desiccant beds by a manually actuated start-up program
  Providing maximum purge upon high outlet humidity (H-option only)
  Providing a compressor shutdown interlock to assist in securing a plant air system
D. Displaying Instantaneous Operating Data
  Inlet flow rate (SCFM)
  Inlet pressure (PSIG)
  Inlet temperature (°F.)
  Accumulated energy saved (KW−HR)
E. Indicating Fault Conditions
  High outlet humidity (H-option only)
  Switching failure
  Sensor failure
  Switching or check valve failure
  Electronic circuit failure
  Low inlet pressure
  Excessive flow rate
  Excessive inlet temperature
  Dirty muffler As indicated previously the various inlet and outlet purge and regeneration sensors have multiple functions, according to which bed is on the adsorption cycle, and which bed is on the regeneration cycle, since a given sensor on one cycle will sense inlet temperature, for example, while on the other cycle it will sense outlet temperature. Which sensor senses which function in which cycle is apparent from this portion of the disclosure.

The dryer systems of the invention can be used with any type of sorbent adapted to absorb moisture from gases. Activated carbon, alumina, silica gel, magnesia, various metal oxides, clays, Fuller's earth, bone char, and Mobilbeads, and like moisture-adsorbing compounds, can be used as the desiccant.

Molecular sieves also can be used, since in many cases these have moisture-removing properties. This class of materials includes zeolites, both naturally-occurring and synthetic, the pores in which may vary in diameter from the order of several Ångstrom units to from 12 to 15 Å or more. Chabasite and analcite are representative natural zeolites that can be used. Synthetic zeolites that can be used include those described in U.S. Pat. Nos. 2,442,191 and 2,306,610. All of these materials are well known as desiccants, and detailed descriptions thereof will be found in the literature.

The dryers described and shown in the drawings are all adapted for purge flow regeneration with the purge passing in counterflow to the wet gas influent. This, as is well known, is the most efficient way of utilizing a desiccant bed. As a wet gas passes through a desiccant bed in one direction, the moisture content of the desiccant progressively decreases, and normally the least amount of moisture will have been adsorbed at the outlet end of the bed. It is consequently only sound engineering practice to introduce the regenerating purge gas from the outlet end, so as to avoid driving moisture from the wetter part of the bed into the drier part of the bed, and thus lengthen the regeneration cycle time required. If the purge flow be introduced at the outlet end, then the moisture present there, although it may be in a small amount, will be removed by the purge flow and brought downwards the wetter end of the bed. Thus, the bed is progressively regenerated from the outlet end, and all the moisture is carried for the least possible distance through the bed before it emerges at the inlet end.

Nonetheless, for some purposes, it may be desirable to run the purge flow in the same direction as the influent flow. In accordance with the invention, it is possible to carry the moisture content of the desiccant to a very high level, much higher than is normally feasible, because of the protecting action of the microprocessor, which makes it possible to ensure regeneration at a time more precisely gauged to moisture level than has heretofore been possible. Consequently, in many cases if the bed is brought nearly to the saturation point throughout, it will make little difference if the purge flow enters at the influent end or at the outlet end, and the invention contemplates both types of operation, although of course counterflow regeneration is preferred in most cases.

The following Example in the opinion of the inventors represents a preferred embodiment of dryer and method of operation of a dryer system in accordance with the invention:

EXAMPLE

A two-bed heatless dryer of the type shown in FIG. 2, having two desiccant beds 50 inches long and 8.25 inches in diameter, each bed containing 75 lbs of activated alumina, was used to dry air at 70% relative humidity, 67° F. to 70° C. and 80 p.s.i.g. inlet pressure. The superficial flow velocity of the air was 55 feet per minute.

Data was collected for a number of drying cycles carried out using this apparatus. It was apparent from the data that the microprocessor controlled regeneration cycle time adequately to fully regenerate the sorbent bed, and that this control with the fixed cycling time of ten minutes, five minutes on each bed, made it possible to terminate the drying cycle time at a safe moisture level in the effluent gas. It was also clear from the different times of the cycle that the microprocessor adjusted cycle regeneration length to match variation in moisture level of the influent air, and reduce wasted purge by cutting down on the amount of purge by only using the purge required in each regeneration.

While the invention has been described with principal emphasis on a desiccant dryer and a process for drying gases, it will be apparent to those skilled in the art that this apparatus with a suitable choice of sorbent can be used for the separation of one or more gaseous components from a gaseous mixture. In such a case, the adsorbed component can be removed from the sorbent with a reduction in pressure, during regeneration, without application of heat. Thus, the process can be used for the separation of hydrogen from petroleum hydrocarbon streams and other gas mixtures containing the same, for the separation of oxygen from nitrogen, for the separation of olefins from saturated hydrocarbons, and the like. Those skilled in the art are aware of sorbents which can be used for this purpose.

In many cases, sorbents useful for the removal of moisture from air can also be used, preferentially to adsorb one or more gas components from a mixture thereof, such as activated carbon, glass wool, adsorbent cotton, metal oxides and clays such as attapulgite and bentonite, Fuller's earth, bone char and natural and synthetic zeolites. The zeolites are particularly effective for the removal of nitrogen, hydrogen and olefins, such as ethylene or propylene, from a mixture with propane and higher paraffin hydrocarbons, or butene or higher olefins. The selectivity of a zeolite is dependent upon the port size of the material. The available literature shows the selective adsorptivity of the available zeolites, so that the selection of a material for a particular purpose is rather simple and forms no part of the instant invention.

Having regard to the foregoing disclosure, the following is claimed as the inventive and patentable embodiments thereof:

1. Gas fractionating apparatus for reducing the concentration of one or more first gases in a mixture thereof with a second gas to below a limiting maximum concentration thereof in the second gas, by passing the mixture in contact with and from one end to another end of one of two beds of a sorbent having a preferential affinity for the first gas, adsorbing first gas thereon to form a gaseous effluent having a concentration thereof below the maximum, and forming a concentration gradient of first gas in the bed progressively decreasing from one end to the other end as the adsorption continues and an increasing concentration of first gas in the bed defining a concentration front progressively advancing in the bed from one end to the other end as sorbent capacity therefor decreases; while passing a purge flow of gaseous effluent through the other of the two beds of sorbent to desorb first gas adsorbed thereon, and reverse the advance of the concentration front of first gas in the bed, regenerating the other bed for another cycle of adsorption; and then periodically interchanging the beds so that alternately, one bed is on regeneration and the other on the adsorption portions of the cycle; comprising, as the essential components, at least two vessels for reception of sorbent beds and adapted for alternate periodic adsorption and regeneration of the sorbent beds contained therein so that one vessel is on the adsorption portion of the cycle while the other vessel is on the regeneration portion of the cycle; means for timing the elapse of selected time intervals for determining the cycling interchange of the beds between adsorption and regeneration and giving a signal; at least one pneumatically-operated flow control valve movable between flow-open and flow-closed positions with one of the opening and closing movements of the valve being controlled by gas pressure at a pilot gas port; cycling control means responsive to the signal given by the timing means and including a pilot gas line tapping a source of pressurized gas for controlling one of the opening and closing movements of the valve by application of gas pressure via the pilot gas line to the valve; means biasing the valve in the other of the closed and open positions; opposed sides of the valve being in communication with upstream and downstream gas pressure in the line controlled by the valve and one of these sides being in communication with the pilot gas port; the cycling control means in response to the signal quickly applying a sufficient differential pressure across the valve via the pilot gas line to exceed a predetermined minimum overcoming the prevailing system pressure differential at the valve, so that the valve is moved to one of the flow-open and flow-closed positions, thereby effecting interchange of the beds in response to actuation by the cycling control means and responsive to differential pressure thereacross, and upon interruption of such application of gas pressure via the pilot gas line the valve will move into the other of the closed and open positions under the prevailing system pressure differential across the valve.

2. A gas fractionating apparatus according to claim 1 in which the one of the opening and closing movements of the valve is controlled by gas pressure at a pilot gas port, applied against the face of a spring-biased piston attached to the valve, the spring biasing the valve in the one of the closed and open positions; opposed faces of the piston being in communication with upstream and downstream gas pressure in the line controlled by the valve, and one of these faces being in communication with the pilot gas port, whereby, upon a sufficient differential pressure across the piston, supplemented to exceed a predetermined minimum via the pilot gas port under the control of the cycling control means, the piston is moved to one of the open and closed positions.

3. A gas fractionating apparatus according to claim 2 in which such valves are in each influent and effluent gas flow line leading to or away from each sorbent bed chamber, and the valves are arranged to open or close according to pressure differential at selected stages of the adsorption and regeneration cycles and put the apparatus inlet and outlet into communication with selected beds for adsorption and regeneration gas flow according to application of gas pressure to the pilot gas port by the cycling control means.

4. A gas fractionating apparatus according to claim 1 including a valve reducing pressure in the sorbent bed during regeneration.

5. A gas fractionating apparatus according to claim 1 including a valve diverting a portion of the dried effluent gas as purge in counterflow through the bed being regenerated.

6. A gas fractionating apparatus according to claim 1 including means in the beds for detecting the arrival of the moisture front therein at a point in the bed sufficiently distant from the effluent end thereof to enable termination of a cycle before the front can leave the bed.

7. A gas fractionating apparatus according to claim 1 including means for applying heat during regeneration.

8. A gas fractionating apparatus according to claim 1, wherein the vessels are heaterless.

9. A gas fractionating apparatus according to claim 1, including an independent source of supply of gas under pressure to the pilot gas port.

10. A gas fractionating apparatus according to claim 1 including a valve diverting a portion of system gas to the pilot gas port.

11. A gas fractionating apparatus according to claim 10 in which the valve diverts effluent gas to the pilot gas port.

12. A gas fractionating apparatus according to claim 10 in which the valve diverts influent gas mixture to the pilot gas port.

13. A gas fractionating apparatus according to claim 10 including pressure-reducing means reducing system gas pressure applied to the pilot gas port.

14. A gas fractionating apparatus according to claim 10 including a pneumatic controller controlling application of gas under pressure to the port.

15. Gas fractionating apparatus for reducing the concentration of one or more first gases in a mixture thereof with a second gas to below a limiting maximum concentration thereof in the second gas, by passing the mixture in contact with and from one end to another end of one of two beds of a sorbent having a preferential affinity for the first gas, adsorbing first gas thereon to form a gaseous effluent having a concentration thereof below the maximum, and forming a concentration gradient of first gas in the bed progressively decreasing from one end to the other end as the adsorption continues and an increasing concentration of first gas in the bed defining a concentration front progressively advancing in the bed from the one end to the other end as sorbent capacity therefor decreases; while passing a purge flow of gaseous effluent through the other of the two beds of sorbent to desorb first gas adsorbed thereon, and reverse the advance of the concentration front of first gas in the bed, regenerating the other bed for another cycle of adsorption; and then periodically interchanging the beds so that, alternately, one bed is on regeneration and the other on the adsorption portions of the cycle; comprising, as the essential components, at least two vessels for reception of sorbent beds and adapted for alternate periodic adsorption and regeneration of the sorbent beds contained therein so that one vessel is on the adsorption portion of the cycle while the other vessel is on the regeneration portion of the cycle; means for controlling and actuating pneumatically at selected time intervals the cycling interchange of the beds between adsorption and regeneration; at least one pneumatically operated flow control valve effecting interchange of the beds in response to actuation by the cycling control means and responsive to differential pressure thereacross, movable whenever so actuated at the selected time between flow-open and flow-closed positions only according to the controlled application thereto of a predetermined pilot gas pressure by the cycling control means, overcoming the prevailing system pressure differential at the valve, whereby upon such controlled application of gas pressure by the control means the valve will move into one of the closed and open positions, and upon interruption of such application the valve will move into the other of the closed and open positions under the prevailing system pressure differential across the valve, thereby effecting interchange of the beds, one of the opening and closing movements of the valve being controlled by gas pressure at a pilot gas port, applied against the face of a spring-biased piston attached to the valve, the spring biasing the valve in the one of the closed and open positions; opposed faces of the piston being in communication with upstream and downstream gas pressure in the line controlled by the valve, and one of these faces being in communication with the pilot gas port, whereby upon a sufficient differential pressure across the piston, supplemented to exceed a predetermined minimum via the pilot gas port under the control of the cycling control means, the piston is moved to one of the open and closed positions; and a dump control exhaust valve that regulates or limits exhaust flow from a sorbent bed during depressurization after adsorption and prior to regeneration, reducing noise and dump flow rate and sorbent bed churning and abrasion during depressurization.

16. Gas fractionating apparatus for reducing the concentration of one or more first gases in a mixture thereof with a second gas to below a limiting maximum concentration thereof in the second gas, by passing the mixture in contact with and from one end to another end of one of two beds of a sorbent having a preferential affinity for the first gas, adsorbing first gas thereon to form a gaseous effluent having a concentration thereof below the maximum, and forming a concentration gradient of first gas in the bed progressively decreasing from one end to the other end as the adsorption continues and an increasing concentration of the first gas in the bed defining a concentration front progressively advancing in the bed from the one end to the other end as sorbent capacity therefor decreases, while passing a purge flow of gaseous effluent through the other of the two beds of sorbent to desorb first gas adsorbed thereon, and reverse the advance of the concentration front of first gas in the bed, regenerating the other bed for another cycle of adsorption; and then periodically interchanging the beds so that, alternately, one bed is on regeneration and the other on the adsorption portions of the cycle, comprising, as the essential components, at least two vessels for reception of sorbent beds and adapted for alternate periodic adsorption and regeneration of the sorbent beds contained therein so that one vessel is on the adsorption portion of the cycle while the other vessel is on the regeneration portion of the cycle; means for controlling the cycling interchange of the beds between adsorption and regeneration; and a dump control exhaust valve comprising a coil-spring valve having on one side a pressure-receiving face exposed to gas pressure in one of the two sorbent bed chambers, via the exhaust valve, and on the opposite side a pressure-receiving face exposed to atmospheric pressure via the exhaust valve, and a critical orifice bleeding gas past the valve when the valve is closed, and thereby limiting exhaust flow from the chamber, whereby, when the exhaust valve opens to atmospheric pressure the chamber going from adsorption into regeneration, reducing pressure from operating pressure to atmospheric, the coil spring under the resulting pressure differential thereacross is compressed shut, but flow can proceed via the critical orifice, so that differential pressure diminishes, and as it does so the spring gradually opens, to permit increasing flow through the coils.

17. A gas fractionating apparatus according to claim 16 comprising downstream of the dump control exhaust valve a muffler diffusing flow before it enters the atmosphere, and thereby attenuating noise.

18. A gas fractionating apparatus according to claim 16 comprising at least one pneumatically operated flow control valve effecting interchange of the beds in response to actuation by the cycling control means and responsive to differential pressure thereacross, movable between flow-open and flow-closed positions according to the application thereof of a predetermined effluent gas pressure controlled by the cycling control means, overcoming the prevailing system pressure differential at the flow control valve, whereby, upon controlled application of effluent gas pressure by the control means the flow control valve will move into one of the closed and open positions, and upon interruption of such application the flow control valve will move into the other of the closed and open positions under the prevailing system pressure differential across the flow control valve.

19. A gas fractionating apparatus according to claim 18 in which one of the opening and closing movements of the flow control valve is controlled by gas pressure at a pilot gas port, applied against the face of a spring-biased piston attached to the flow control valve, the spring biasing the flow control valve into one of the closed and open positions, opposed faces of the piston being in communication with upstream and downstream gas pressure in the line controlled by the flow control valve, and one of these faces being in communication with the pilot gas port, whereby, upon application of a sufficient differential pressure across the piston, supplemented by gas pressure applied to one face of the piston via the pilot gas port under the control of the cycling control means, the piston is moved to the other of the open and closed positions.

20. A gas fractionating apparatus according to claim 18 in which such flow control valves are in each influent and effluent gas flow leading to or away from each sorbent bed chamber; and the flow control valves are arranged to open or close according to pressure differential at selected stages of the adsorption and regeneration cycles and put the apparatus inlet and outlet into communication with selected beds for adsorption and regeneration gas flow according to application of gas pressure to the pilot gas port by the cycling control means.

21. A gas fractionating apparatus for reducing the concentration of one or more first gases in a mixture thereof with a second gas to below a limiting maximum concentration thereof in the second gas, by passing the mixture in contact with and from one end to another end of one of two beds of a sorbent having a preferential affinity for the first gas, adsorbing first gas thereon to form a gaseous effluent having a concentration thereof below the maximum, and forming a concentration gradient of first gas in the bed progressively decreasing from one to the other end as the adsorption continues and an increasing concentration of first gas in the bed defining a concentration front progressively advancing in the bed from the one end to the other end as sorbent capacity therefor decreases; while passing a purge flow of gaseous effluent through the other of the two beds of sorbent to desorb first gas adsorbed thereon, and reverse the advance of the concentration front of first gas in the bed, regenerating the other bed for another cycle of adsorption; and then periodically interchanging the beds so that, alternately, one bed is on regeneration and the other on the adsorption portions of the cycle, comprising, as the essential components, at least two sorbent beds adapted for alternate periodic downflow adsorption, and periodic upflow regeneration; means in the beds for sensing the gas flow rate through the bed on adsorption, inlet and outlet gas temperatures and pressures, and regeneration pressure; and a microprocessor programmed to calculate the quantity of purge required to regenerate the adsorbent bed off-stream for regeneration; calculate the purge flow rate; and based on these calculations, control the regeneration time so that purge flow ceases when the adsorbent bed has been regenerated; means operated by the microprocessor for controlling and actuating pneumatically the cycling interchange of the adsorbent beds between adsorption and regeneration at the end of each cycle period; and at least one pneumatically-operated flow control valve comprising a valve element mounted for reciprocable bi-directional movement and having on opposite faces pressure-receiving surfaces open to upstream and downstream gas pressure; and movable whenever so actuated in one of two directions between flow-open and flow-closed positions against a valve seat according to the controlled application thereto of a predetermined pilot gas pressure by the cycling control means, overcoming the prevailing system pressure differential at the valve, whereby upon such controlled application of gas pressure by the control means the valve will move into one of the closed and open positions, and upon interruption of such application the valve will move into the other of the closed and open positions under the prevailing system pressure differential across the valve; thereby effecting intechange of the beds.

22. A gas fractionating apparatus according to claim 21 comprising bias means biasing the valve element into one of the open and closed positions at pressures up to a predetermined minimum; the control means applying sufficient pressure to overcome the biasing force of the bias means.

23. A gas fractionating apparatus for reducing the concentration of one or more first gases in a mixture thereof with a second gas to below a limiting maximum concentration thereof in the second gas, by passing the mixture in contact with and from one end to another end of one of two beds of a sorbent having a preferential affinity for the first gas, adsorbing first gas thereon to form a gaseous effluent having a concentration thereof below the maximum, and forming a concentration gradient of first gas in the bed progressively decreasing from one to the other end as the adsorption continues and an increasing concentration of first gas in the bed defining a concentration front progressively advancing in the bed from the one end to the other end as sorbent capacity therefor decreases; while passing a purge flow of gaseous effluent through the other of the two beds of sorbent to desorb first gas adsorbed thereon, and reverse the advance of the concentration front of first gas in the bed, regenerating the other bed for another cycle of adsorption; and then periodically interchanging the beds so that, alternately, one bed is on regeneration and the other on the adsorption portions of the cycle, comprising, as the essential components, at least two sorbent beds adapted for alternate periodic downflow adsorption, and periodic upflow regeneration; means in the beds for sensing the gas flow rate through the bed on adsorption, inlet and outlet gas temperatures and pressures, and regeneration pressure; and a microprocessor programmed to calculate the quantity of purge required to regenerate the adsorbent bed off-stream for regeneration; calculate the purge flow rate; and based on these calculations, control the regeneration time so that purge flow ceases when the adsorbent bed has been regenerated; control means for controlling the cycling time, and interchange the adsorbent beds at the end of each cycle period; and at least one exhaust flow control valve for reducing exhaust gas noise and flow at the start of depressurization comprising a valve element in the form of a conical helically coiled wire spring having an open central passage therethrough, whose sides are defined by the sides of the coils, with a critical orifice disposed in the passage, and movable under exhaust gas pressure between an expanded open position in which gas can flow between the spring coils and a compressed closed position with the coils collapsed and in contact with each other, closing off the sides of the passage and compelling all flow through the passage to pass through the critical orifice, thereby reducing flow and exhaust noise at the start of depressurization, gradually bleeding off gas via the orifice reducing exhaust gas pressure, and allowing the spring gradually to expand into a fully open position.

* * * * *